(12) United States Patent
Haba et al.

(10) Patent No.: US 8,964,230 B2
(45) Date of Patent: Feb. 24, 2015

(54) IMAGE FORMING APPARATUS, IMAGE FORMING SYSTEM, AND COMPUTER-READABLE RECORDING MEDIUM THAT ACQUIRES JOB-RELATED INFORMATION FROM A STORAGE UNIT

(71) Applicant: Konica Minolta, Inc., Chiyoda-ku (JP)

(72) Inventors: Shoko Haba, Toyokawa (JP); Ryosuke Nishimura, Toyokawa (JP); Takao Kurohata, Hino (JP); Jun Kunioka, Okazaki (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/030,659

(22) Filed: Sep. 18, 2013

(65) Prior Publication Data

US 2014/0078551 A1  Mar. 20, 2014

(30) Foreign Application Priority Data

Sep. 19, 2012  (JP) ................. 2012-205374

(51) Int. Cl.
G06F 15/00  (2006.01)
G06F 3/12  (2006.01)
G06K 1/00  (2006.01)

(52) U.S. Cl.
CPC ............ *G06F 3/1296* (2013.01); *G06F 3/1212* (2013.01); *G06F 3/1263* (2013.01); *G06F 3/1285* (2013.01); *G06F 3/1291* (2013.01)
USPC ........................................ 358/1.15; 358/1.14

(58) Field of Classification Search
CPC ... G06F 3/1296; G06F 3/1212; G06F 3/1263; G06F 3/1285; G06F 3/1291
USPC ................ 358/1.1, 1.15, 1.14, 1.13
See application file for complete search history.

(56) References Cited

U.S. PATENT DOCUMENTS

| 8,619,269 | B2 * | 12/2013 | Jahn et al. ............. 358/1.1 |
| 2007/0081186 | A1 | 4/2007 | Numata |
| 2009/0276849 | A1 * | 11/2009 | Otomo et al. .......... 726/19 |
| 2011/0137857 | A1 | 6/2011 | Numata |

FOREIGN PATENT DOCUMENTS

JP  2003-087539 A  3/2003

(Continued)

OTHER PUBLICATIONS

Japanese Office Action issued Oct. 28, 2014, in corresponding Japanese Patent Application No. 2012-205374, and English translation thereof.

*Primary Examiner* — Douglas Tran
(74) *Attorney, Agent, or Firm* — Buchanan Ingersoll & Rooney PC

(57) ABSTRACT

An image forming apparatus includes an import unit configured to import import data from a storage apparatus in which the import data is stored, a job accepting unit configured to accept a job to be executed by the image forming apparatus, a determination unit configured to determine a type of job-related information that is specific information required to execute the job among information included in the import data, an acquisition unit configured to acquire the job-related information of the type determined by the determination unit from the storage apparatus before completion of import processing performed by the import unit, and a job execution unit configured to execute the job, using the job-related information acquired by the acquisition unit.

21 Claims, 24 Drawing Sheets

(56) References Cited

FOREIGN PATENT DOCUMENTS

| JP | 2006-033342 A | 2/2006 |
| JP | 2007-105937 A | 4/2007 |
| JP | 2008-195041 A | 8/2008 |
| JP | 2011-120177 A | 6/2011 |

* cited by examiner

| ID | USER NAME | ... | ... |
|---|---|---|---|
| | <BOX REGISTRATION> | | |
| 1 | USER UA | * * * | EDIT |
| 2 | USER UB | * * * | EDIT |
| 3 | USER UC | * * * | EDIT |
| 4 | (UNASSIGNED) | | EDIT |
| 5 | USER UD | * * * | EDIT |
| 6 | USER UE | * * * | EDIT |

OK    CANCEL

<BOX REGISTRATION>

| ID | USER NAME | ... | ... |
|---|---|---|---|
|  |  |  |  |
|  |  |  |  |
|  |  |  |  |
| 4 | (UNASSIGNED) |  | EDIT |
|  |  |  |  |
|  |  |  |  |

OK    CANCEL

IMAGE FORMING APPARATUS, IMAGE FORMING SYSTEM, AND COMPUTER-READABLE RECORDING MEDIUM THAT ACQUIRES JOB-RELATED INFORMATION FROM A STORAGE UNIT

This application is based on Japanese Patent Application No. 2012-205374 filed on Sep. 19, 2012, the contents of which are hereby incorporated by reference.

BACKGROUND OF THE INVENTION

1. Technical Field

The present invention relates to an image forming apparatus such as a Multi-Functional Peripheral (MFP), and to a technique related thereto.

2. Background Art

Image forming apparatuses such as MFPs store therein various types of information such as user information and destination information.

Techniques for synchronizing such various types of information throughout a plurality of image forming apparatuses are disclosed (in, for example, Japanese Patent Application Laid-Open Nos. 2011-120177 (Patent Document 1) and 2003-087539 (Patent Document 2)). Although it depends on the amount of data, the synchronization processing generally takes a relatively long time.

Patent Document 1 discloses a technique for performing synchronization processing using a file that requires a relatively short processing time among a plurality of files in different file formats. Patent Document 2 discloses a technique for exporting only destination information that is usable by an apparatus on the import side so as to reduce the import time of the import-side apparatus.

With the techniques disclosed in Patent Documents 1 and 2 above, it is possible to reduce the import time, but the apparatus that imports data cannot execute any job until completion of the transmission of import data. Thus, a user who wants to use the apparatus that imports data has to wait until the completion of transmission of import data.

For example, in the case of using the technique disclosed in Patent Document 1 (or Patent Document 2) described above, a situation is assumed in which during synchronization processing involving the transmission of import data from an old MFP to a new MFP, an authenticated print job is issued from another apparatus (e.g., a computer) to the new MFP. Here, the authenticated print job refers to a job that involves user authentication processing. In the authenticated print job, the user authentication processing is performed by comparing input information input by the user via the computer with the user information stored in the new MFP, and if the authentication has succeeded, printout processing is permitted and performed.

In the situation described above, the new MFP cannot execute any job (e.g., the authenticated print job) until the transmission of import data is complete. Thus, the user has to wait for the new MFP to start executing the job until the completion of the transmission of import data. In particular, with the authenticated print job, the user authentication processing cannot take place in a state before the completion of import processing and in which user information is not yet stored in the new MFP, and accordingly it is not possible to complete the authenticated print job. In other words, the authenticated print job cannot be completed even if it is forced to be executed before the completion of the transmission of import data.

A similar problem described above can also occur in various types of synchronization processing because synchronization processing is performed not only between old and new apparatuses, but also between apparatuses currently in use.

SUMMARY OF THE INVENTION

One of objects of the present invention is to provide a technique that allows various types of jobs to be executed without waiting for import processing to complete.

According to a first aspect of the present invention, an image forming apparatus includes an import unit configured to import import data from a storage apparatus in which the import data is stored, a job accepting unit configured to accept a job to be executed by the image forming apparatus, a determination unit configured to determine a type of job-related information that is specific information required to execute the job among information included in the import data, an acquisition unit configured to acquire the job-related information of the type determined by the determination unit from the storage apparatus before completion of import processing performed by the import unit, and a job execution unit configured to execute the job, using the job-related information acquired by the acquisition unit.

According to a second aspect of the present invention, a non-transitory computer-readable recording medium recording a program for causing a computer built into an image forming apparatus to execute a) accepting a job to be executed by the image forming apparatus, b) determining a type of job-related information that is specific information required to execute the job, c) before completion of import processing for importing import data from a storage apparatus in which the import data is stored, acquiring the job-related information of the type determined in the step b) from the storage apparatus, and d) executing the job, using the job-related information acquired in the step c).

According to a third aspect of the present invention, an image forming system includes an image forming apparatus, and a storage apparatus in which import data to be imported into the image forming apparatus is stored. The image forming apparatus includes an import unit configured to import the import data from the storage apparatus, a job accepting unit configured to accept a job to be executed by the image forming apparatus, a determination unit configured to determine a type of job-related information that is specific information required to execute the job among information included in the import data, an acquisition unit configured to acquire the job-related information of the type determined by the determination unit from the storage apparatus before completion of import processing performed by the import unit, and a job execution unit configured to execute the job, using the job-related information acquired by the acquisition unit.

These and other objects, features, aspects and advantages of the present invention will become more apparent from the following detailed description of the present invention when taken in conjunction with the accompanying drawings.

BRIEF DESCRIPTION OF THE DRAWINGS

FIG. 20 illustrates a box registration status in an MFP 10 (a transmission source apparatus).

FIG. 21 shows a registration screen used in a box registration job.

DETAILED DESCRIPTION OF THE PREFERRED EMBODIMENTS

Hereinafter, embodiments of the present invention will be described with reference to the drawings.

1. First Embodiment

1-1. Overall Configuration

Figure 1:
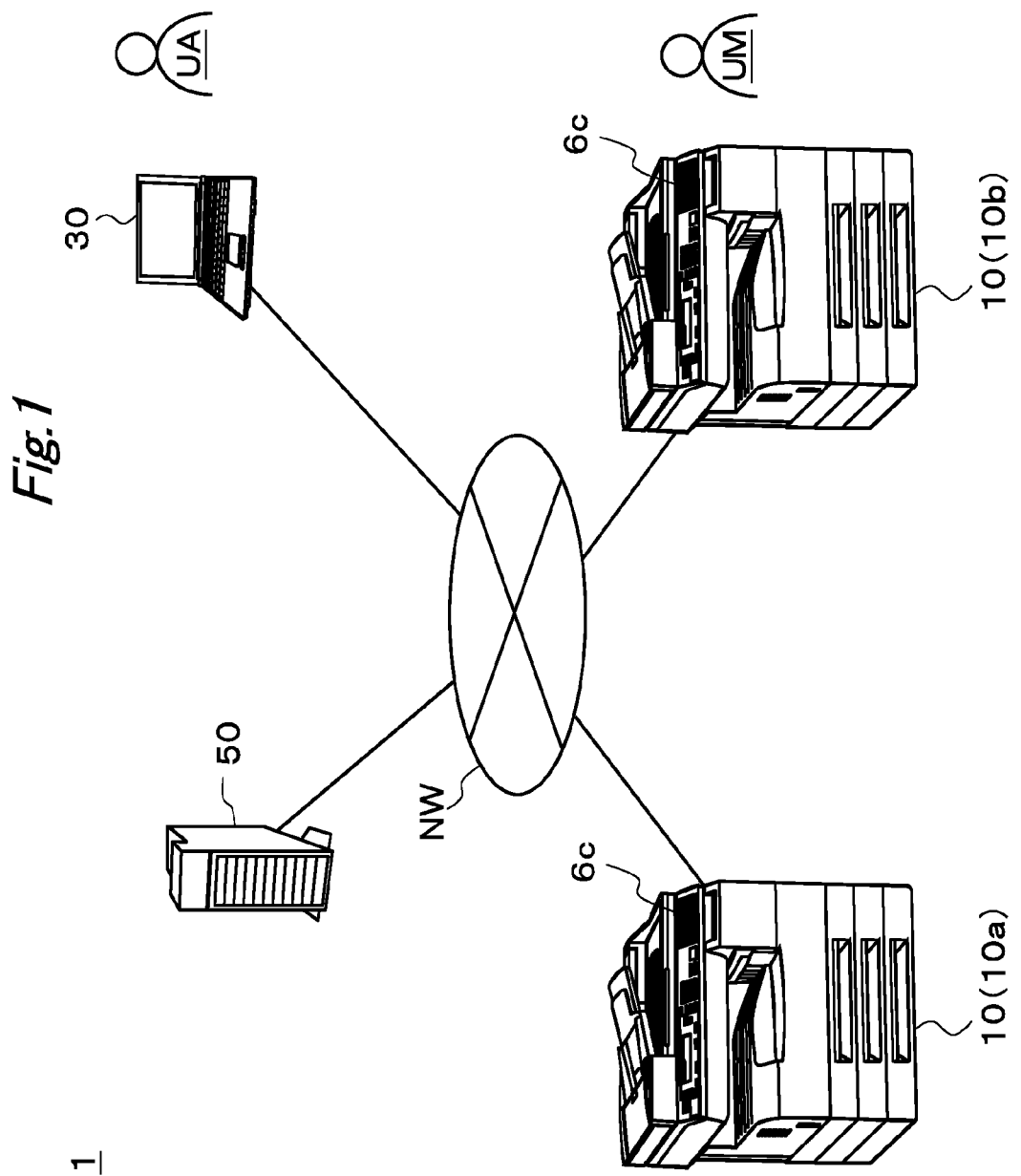
FIG. 1 illustrates an image forming system according to a first embodiment.

FIG. 1 illustrates an image forming system 1 according to a first embodiment. As illustrated in FIG. 1, the image forming system 1 includes a plurality of image forming apparatuses 10. The image forming system 1 also includes a client computer (also simply referred to as a "client") 30 and a server computer (also simply referred to as a "server") 50.

The constituent elements 10, 30, and 50 of the system 1 are communicably connected to one another via a network NW. The network NW is configured by, for example, a local area network (LAN) and the Internet. The form of connection to the network NW may be either wired or wireless.

The image forming system 1 makes it possible to perform synchronization processing among a plurality of image forming apparatuses 10. Specifically, data for synchronization (data to be imported into a new image forming apparatus 10b) is transmitted from an old image forming apparatus 10a to the new image forming apparatus 10b. In other words, data exported from the image forming apparatus 10a is imported into the image forming apparatus 10b. Such import processing allows synchronization processing to be performed between the image forming apparatuses 10a and 10b.

In the image forming system 1 according to the first embodiment, an instruction to execute a job (specifically, an authenticated print job from the computer 30) is accepted during execution of import processing as will be described later. The system can execute the job without waiting for the import processing to complete by, for example, acquiring desired job-related information JM, which will be described later, in advance from among import data.

1-2. Configuration of Image Forming Apparatus 10

In the present embodiment, a Multi-Functional Peripheral (MFP) is given as an example of the image forming apparatus 10.

Figure 2:
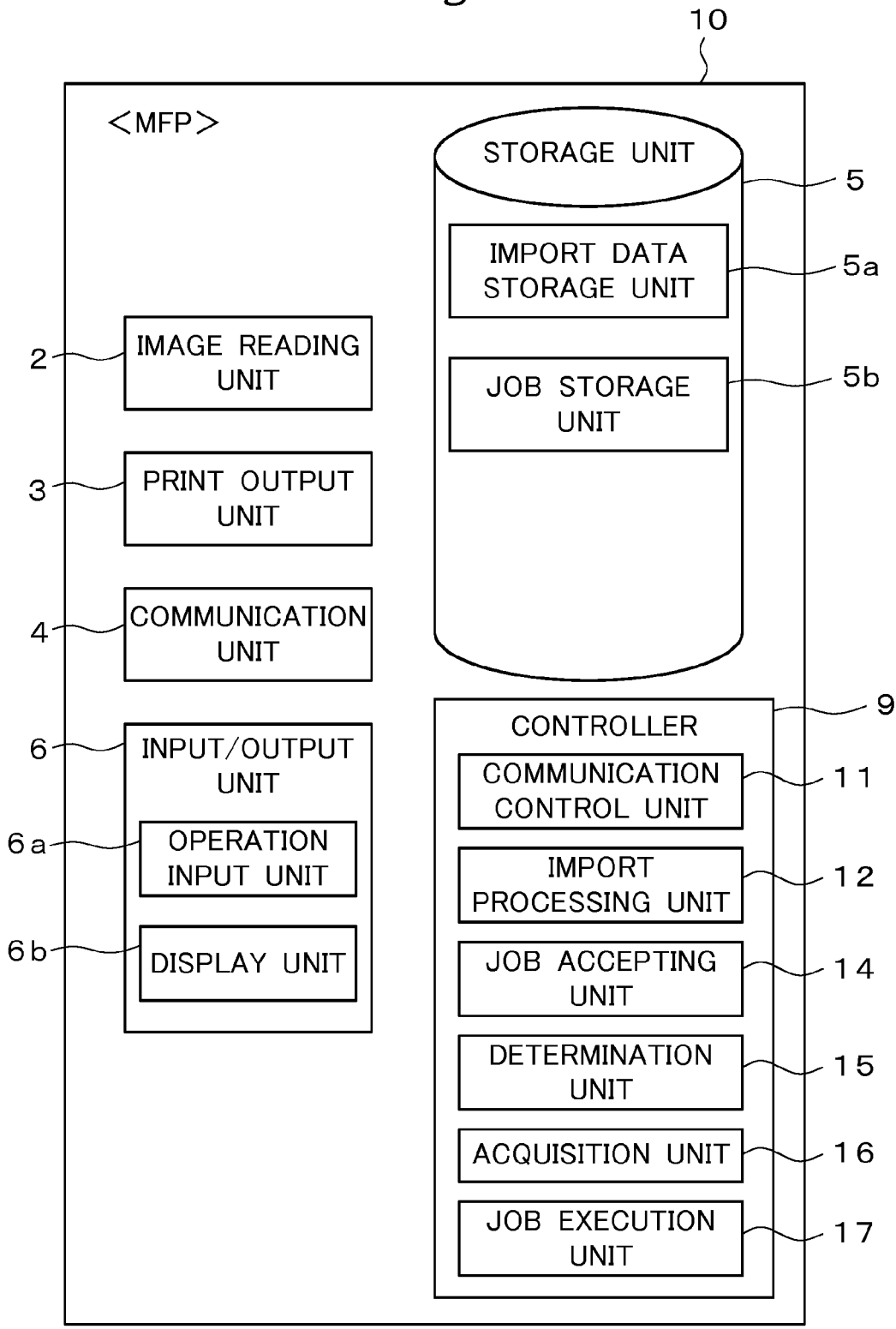
FIG. 2 is a functional block diagram illustrating a schematic configuration of an MFP.

FIG. 2 is a functional block diagram illustrating a schematic configuration of an MFP 10. The following description focuses on the functional blocks of the MFP 10b (see FIG. 1). The MFP 10a also has the same configuration as the MFP 10b.

The MFP 10 is an apparatus (also referred to as the "Multi-Functional Peripheral") having functions such as a scan function, a copy function, a facsimile function, and a box storage function. Specifically, the MFP 10 includes, for example, an image reading unit 2, a print output unit 3, a communication unit 4, a storage unit 5, an input/output unit 6, and a controller 9 as illustrated in the functional block diagram of FIG. 2. The MFP 10 implements various types of functions by operating the above units in combination.

The image reading unit 2 is a processing unit configured to optically read (i.e., scan) an original document placed at a predetermined position on the MFP 10 and generate image data (also referred to as an "original image" or a "scanned image") for the document. The image reading unit 2 is also referred to as a "scan unit."

The print output unit 3 is an output unit configured to print out an image on various types of media such as paper on the basis of data to be printed.

The communication unit 4 is a processing unit capable of facsimile communication via a public network or the like. The communication unit 4 is also capable of network communication via the network NW. In the network communication, various types of protocols such as the transmission control protocol/internet protocol (TCP/IP) are used, for example. Using the network communication allows the MFP 10 to exchange various types of data with a desired apparatus.

The storage unit 5 is constituted by a storage apparatus such as a hard disk drive (HDD). The storage unit 5 includes an import data storage unit 5a and a job storage unit 5b. The import data storage unit 5a stores import data (data for synchronization), and the job storage unit 5b stores job-related data.

The input/output unit 6 includes an operation input unit 6a configured to accept input to the MFP 10, and a display unit 6b configured to display and output various types of information. The MFP 10 is provided with an operation panel unit 6c that includes a touch panel (also referred to as a "touch screen") (see FIG. 1) configured by embedding piezoelectric sensors or the like in a liquid crystal display panel. The operation panel unit 6c functions not only as part of the operation input unit 6a, but also as part of the display unit 6b.

The controller 9 is a control device that is built into the MFP 10 and performs overall control of the MFP 10. The controller 9 is configured as a computer system including, for example, a CPU and various types of semiconductor memories (a RAM and a ROM). The controller 9 implements various types of processing units by causing the CPU to execute a predetermined software program (hereinafter, also simply referred to as a "program") PG1 stored in the ROM (e.g., an EEPROM). Note that the program PG1 may be recorded on a portable recording medium such as a USB memory (in other words, various types of computer-readable non-transitory recording media) and installed into the MFP 10 via the recording medium. Alternatively, the program PG1 may be downloaded and installed into the MFP 10 via the network NW or the like.

By executing the program PG1, the controller 9 implements various types of processing units including a communication control unit 11, an import processing unit 12, a job accepting unit 14, a determination unit 15, an acquisition unit 16, and a job execution unit 17 as illustrated in FIG. 2.

The communication control unit 11 is a processing unit configured to control communication with other apparatuses in cooperation with the communication unit 4.

The import processing unit 12 is a processing unit configured to import import data DM for synchronization, which will be described later, from another data storage apparatus (e.g., another MFP 10).

The job accepting unit 14 is a processing unit configured to accept a job to be executed by the MFP 10. The job accepting unit 14 accepts, for example, an authenticated print job from the computer 30.

The determination unit 15 is a processing unit configured to determine the type of specific information (job-related information) JM required to execute a job from among information included in the import data DM.

The acquisition unit 16 is a processing unit configured to acquire job-related information JM of the type determined by the determination unit 15, from an apparatus in which import data is stored (e.g., the MFP 10a). The job-related information JM is acquired from an apparatus in which import data is stored, or in other words, the MFP 10a (specifically, the storage unit 5 of the MFP 10a) or the like that is a transmission source apparatus of the import data. The acquisition unit 16 is capable of acquiring the job-related information JM before the completion of import processing performed by the import processing unit 12.

The job execution unit 17 is a processing unit configured to execute the job accepted by the job accepting unit 14. Using the job-related information JM acquired by the acquisition unit 16, the job execution unit 17 executes the job without waiting for the completion of import processing.

The communication control unit 11 or the like of the MFP 10a also controls an operation of transmitting the import data DM to the MFP 10b and an operation of transmitting the job-related information JM to the MFP 10b.

1-3. Operation

Next is a description of operations performed in the system 1.

In the present embodiment, data for synchronization DM (data to be imported into the apparatus 10b (hereinafter, also simply referred to as "import data")) is transmitted from the old MFP 10a to the new MFP 10b via the network NW. It is assumed that the import data DM is stored in the old MFP 10a (specifically, the storage unit 5 of the MFP 10a), but is not yet stored in the new MFP 10b (specifically, the storage unit 5 of the MFP 10b).

The data for synchronization DM is transmitted from the MFP 10a on the transmission source side (the apparatus on the export side) to the MFP 10b on the transmission destination side (the apparatus on the import side) via the network NW and is imported into the MFP 10b. In the present embodiment, a situation is assumed in which the MFP 10b accepts an authenticated print job (specifically, a PC print job involving user authentication) from the computer 30 during the transmission of the import data DM (specifically, before completion of the transmission) and executes the authenticated print job without waiting for the completion of the import processing. Such a mode will be described below in detail with reference to FIGS. 3 to 9.

Figure 3:
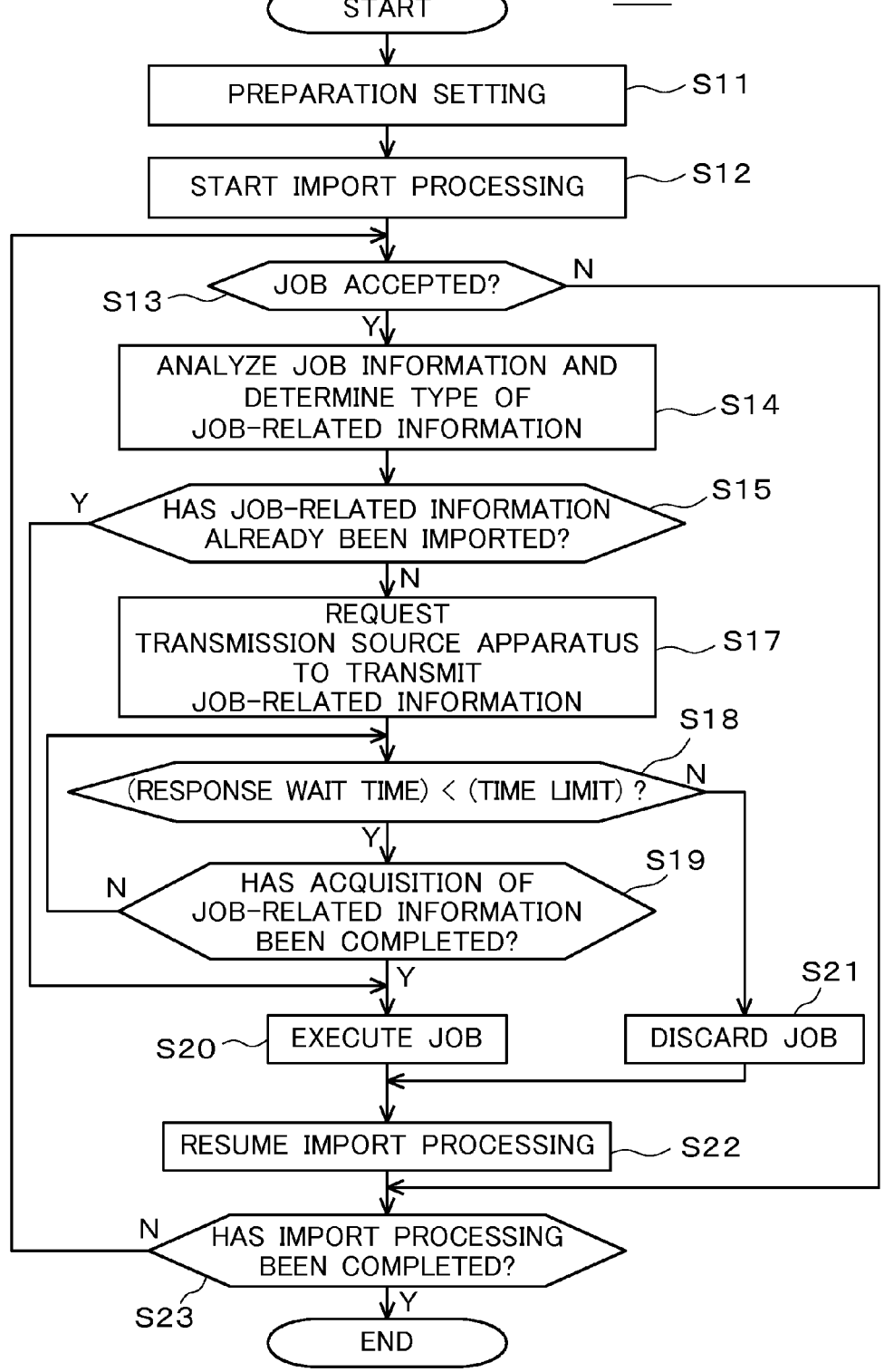
FIG. 3 is a flowchart of operations performed by an MFP (an apparatus on the import side).
Figure 4:
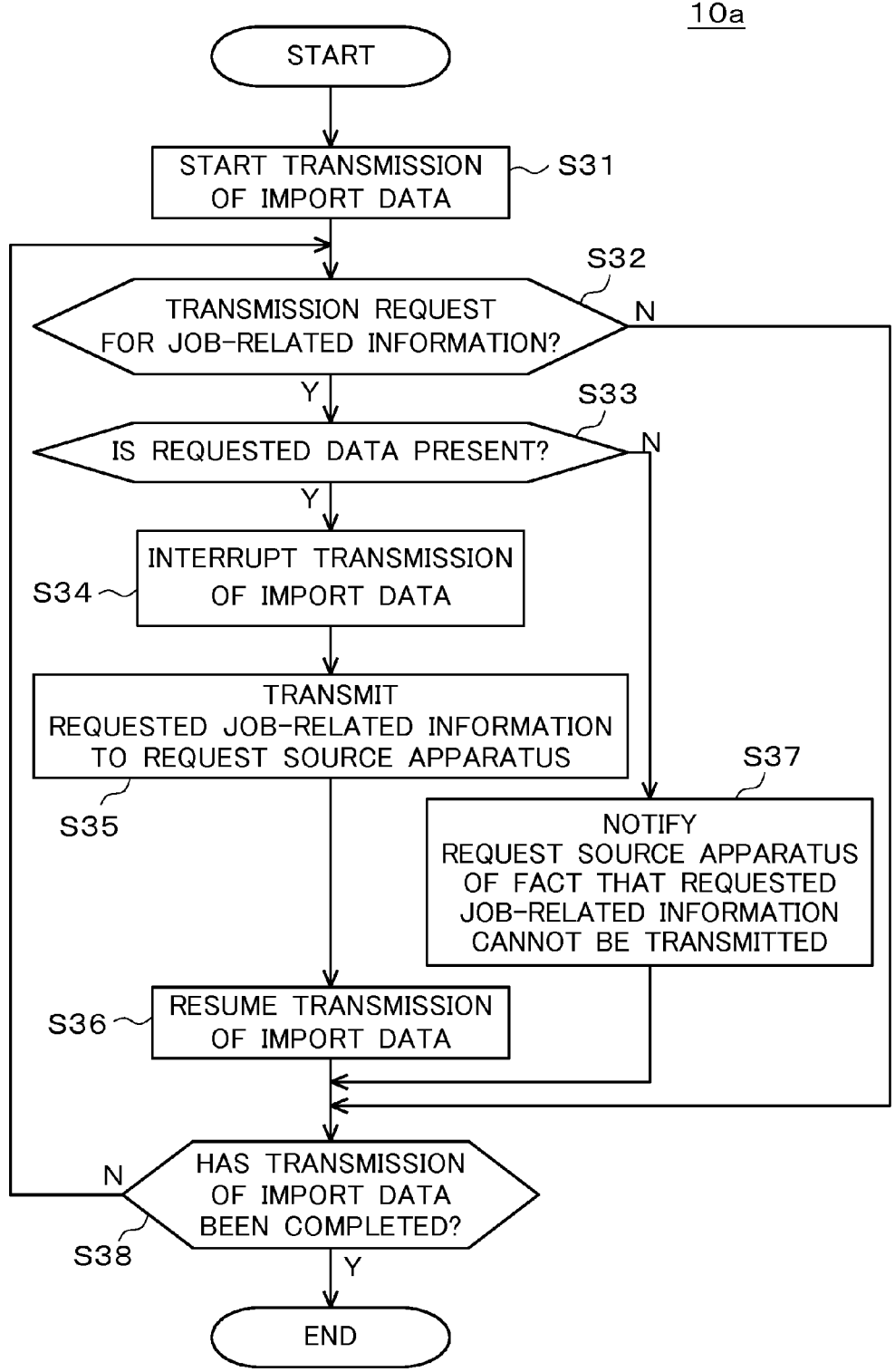
FIG. 4 is a flowchart of operations performed by an MFP (an apparatus on the export side).

FIG. 3 is a flowchart of operations performed by the MFP 10b (the apparatus on the import side), and FIG. 4 is a flowchart of operations performed by the MFP 10a (the apparatus on the export side). FIGS. 5 to 9 illustrate flows of data in the system.

Figure 10:
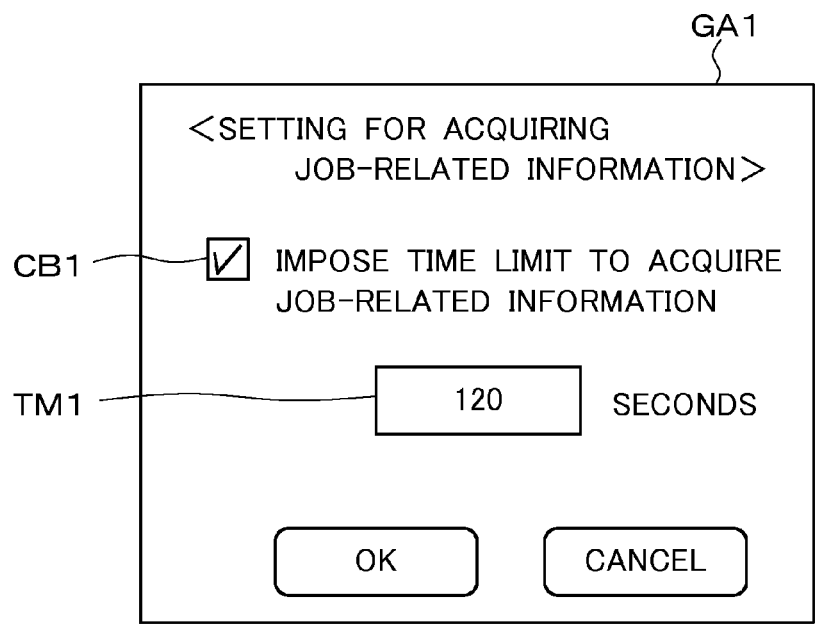
FIG. 10 shows a setting screen displayed when job-related information is acquired.

As shown in FIG. 3, first, the MFP 10b performs a preparation operation for import processing in step S11 prior to the start of transmission of the import data DM from the MFP 10a to the MFP 10b. Specifically, a user UM (e.g., an administrative user) sets whether or not to impose a time limit to acquire job-related information (described later) and the actual time limit TR (described later), using a setting screen GA1 (see FIG. 10) displayed on the operation panel unit 6c of the MFP 10b through a predetermined user operation via the MFP 10b. In the setting screen GA1 shown in FIG. 10, whether or not to impose a time limit is specified by placing a checkmark in a checkbox CB1. Also, the time limit TR of "120 seconds" to acquire the job-related information is set by inputting "120" in an entry field TM1.

Next, in step S12, the transmission of the import data DM from the MFP 10a to the MFP 10b is started. Specifically, when the user UM gives an instruction to start import processing by pressing an import start button in an instruction screen (not shown), the MFP 10b starts import processing in accordance with the start instruction from the user UM.

Figure 5:
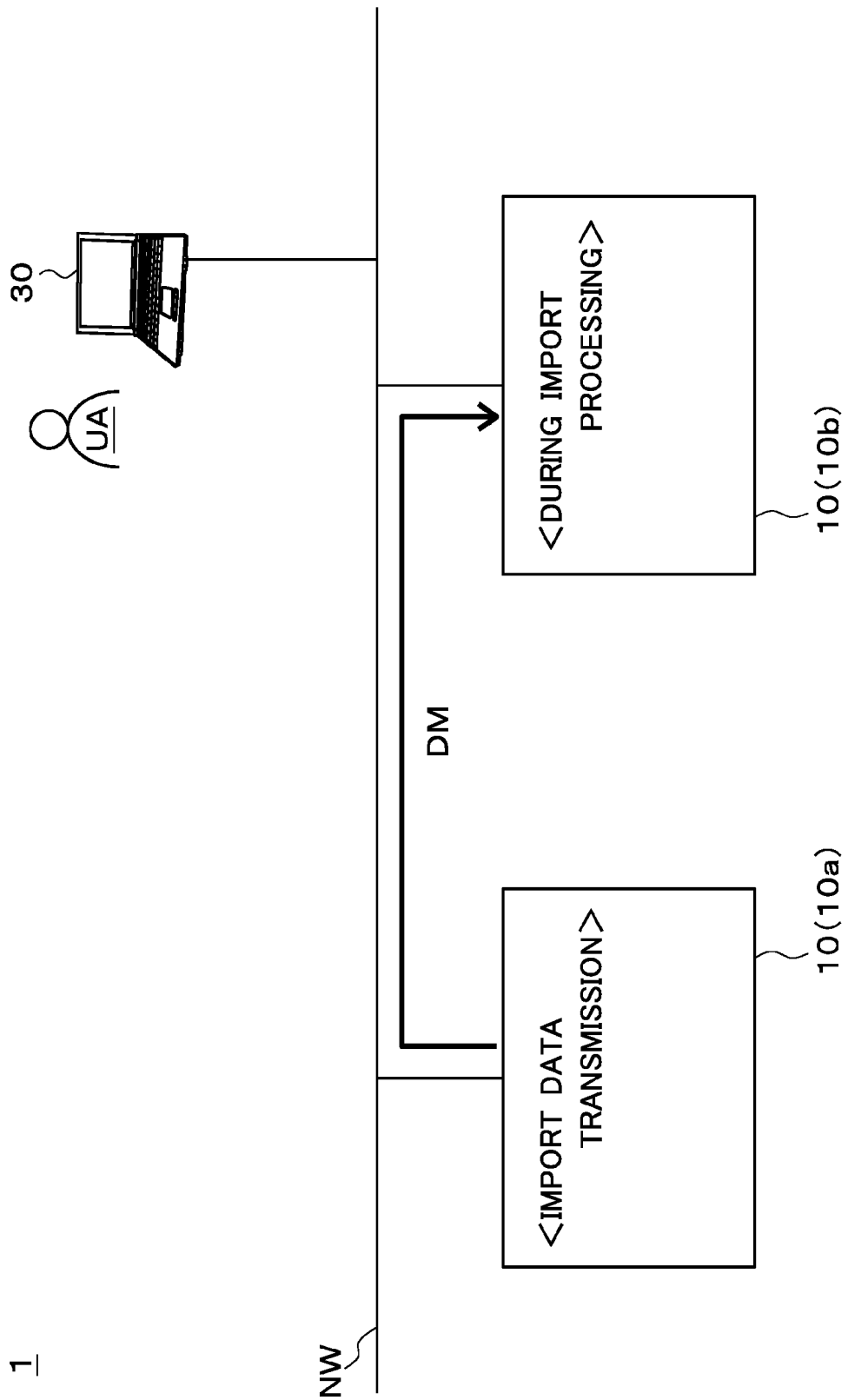
FIG. 5 illustrates a flow of data in a system according to the present invention.

To be more specific, the MFP 10b gives a transmission request to transmit the import data DM to the MFP 10a, and the MFP 10a starts transmission of the import data DM to the MFP 10b in response to the transmission request from the MFP 10b (step S31 in FIG. 4). FIG. 5 shows that the import data DM is transmitted from the MFP 10a to the MFP 10b.

In the import processing, information to be imported is divided into a plurality of sub information pieces (e.g., device setting information, address book information, user information, and box information) and then transmitted, and each transmitted sub information piece is imported into the MFP 10b as appropriate. For example, first, the importing of the "device setting information" into the MFP 10b is completed upon completion of the transmission of the "device setting information." Next, the importing of the "address book information" into the MFP 10b is completed upon completion of the transmission of the "address book information." Subsequently, the importing of each sub information piece such as "user information" or "box information" into the MFP 10b is completed as appropriate along with the transmission of the sub information piece. In this way, the importing of information is completed as appropriate for each sub information piece. Note that the device setting information includes, for example, management information regarding the MFPs 10, and the address book information includes, for example, destination information used in, for example, facsimile (fax) communication, e-mail communication, server message block (SMB) communication, and/or file transfer protocol (FTP) communication. The user information includes, for example, authentication information regarding the users of the MFPs 10, and the box information includes, for example, registration information regarding boxes (folders) in the MFPs 10 and file information regarding files in the boxes.

If there is no job accepted by the MFP 10b, the import processing is continuously executed until completion of the transmission.

Specifically, as shown in FIG. 3, in the MFP 10b, if it is determined that there is no job accepted ("NO"), the processing proceeds from step S13 to step S23, in which it is determined whether or not the import processing is completed. If the import processing has not yet been completed ("NO"), the procedure returns from step S23 again to step S13. On the other hand, if the import processing is completed ("YES"), the processing in FIG. 3 ends.

Meanwhile, the MFP 10a performs processing as shown in FIG. 4. To be specific, if "NO" is determined in determination processing in step S32 (determination of whether or not there is a transmission request to transmit job-related information), the processing proceeds to step S38. Then, if it is determined that the import processing has not yet been completed ("NO") in determination processing in step S38 (determination of whether or not the transmission of the import data is completed), the processing returns from step S38 again to step S32. On the other hand, if it is determined that the transmission of the import data has been completed ("YES"), the processing in FIG. 4 ends.

Figure 6:
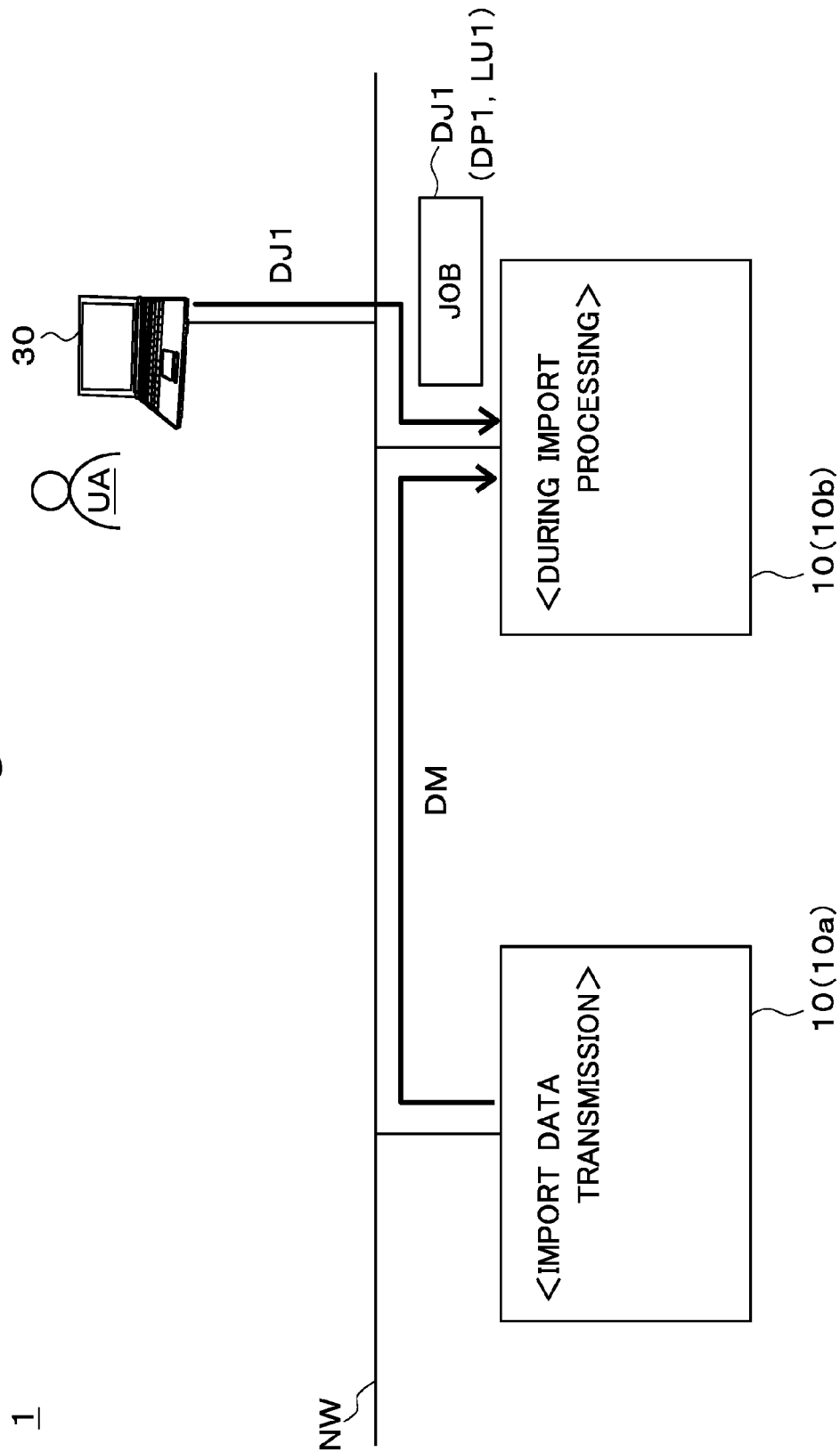
FIG. 6 illustrates a flow of data in the system.
Figure 7:
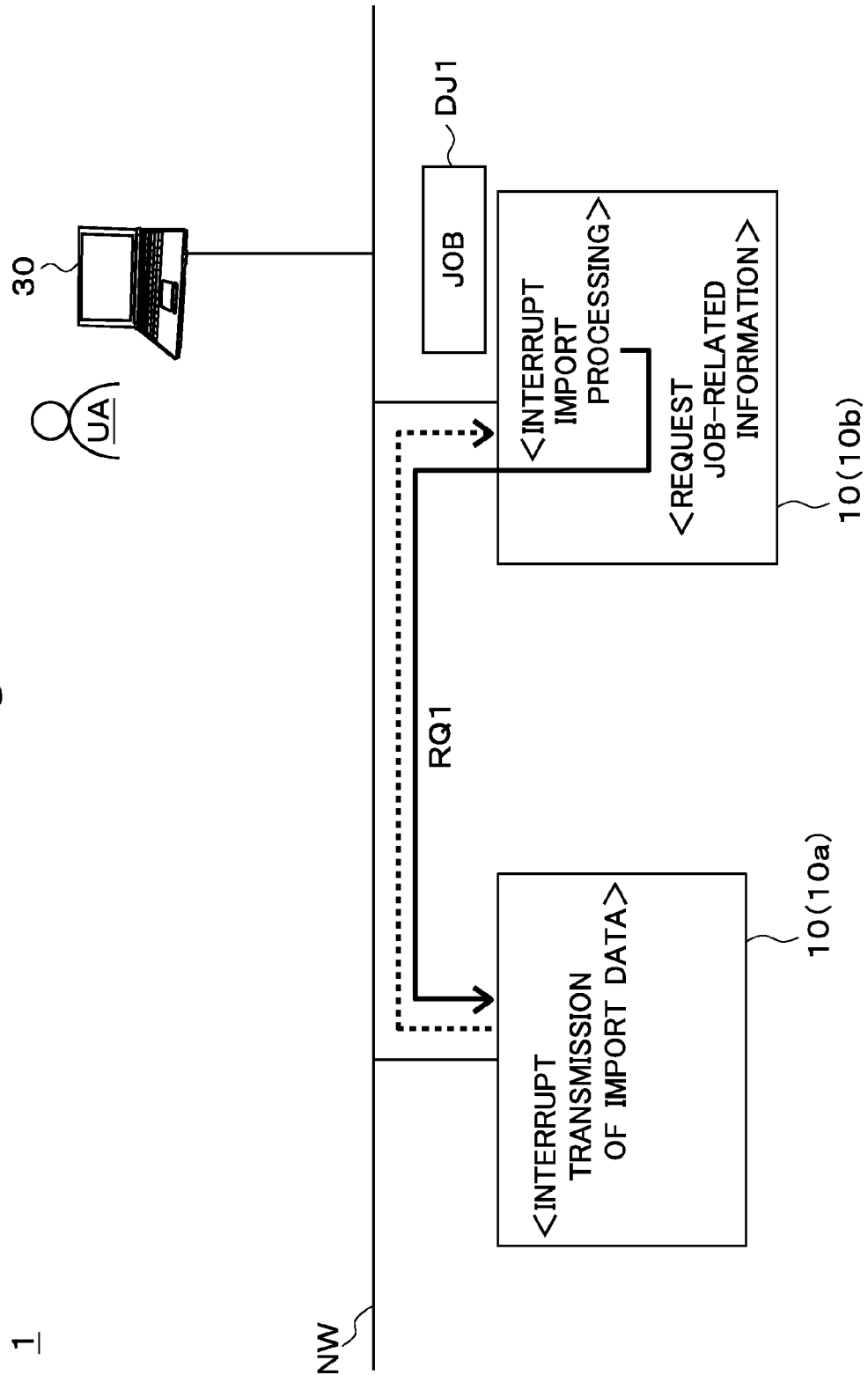
FIG. 7 illustrates a flow of data in the system.

In the present embodiment, a situation is assumed in which a user UA (e.g., a general user) inputs a job (specifically, an authenticated print job) to the MFP 10b via the computer 30 during the import processing as described above, and the MFP 10b accepts the job as illustrated in FIG. 6. As described above, information is imported for each sub information piece. Thus, at the time when the job is input, a situation can also arise in which the "device information" has already been imported, but the other information (e.g., the "address book information," the "user information," and the "box information") has not yet been imported.

Figure 12:
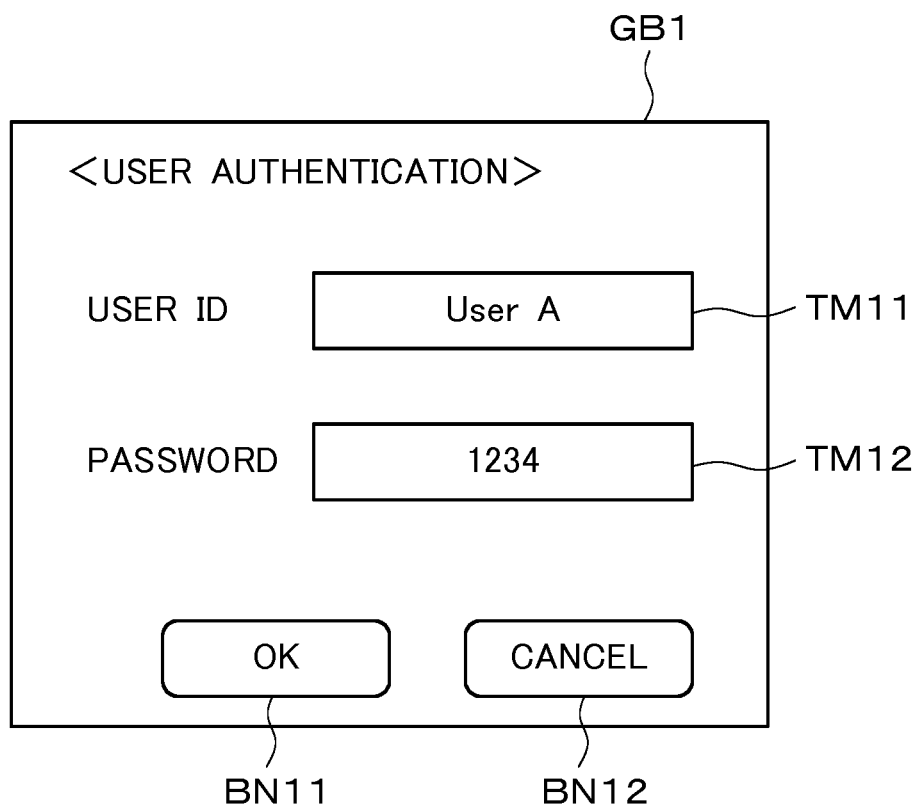
FIG. 12 shows a user authentication screen used in an authenticated print job.

FIG. 12 shows a user authentication screen GB1 used in the authenticated print job. The user authentication screen GB1 is displayed on a display unit of the computer 30. As shown in FIG. 12, the user authentication screen GB1 includes an entry field TM11 for the user ID, an entry field TM12 for the password (the login password), an OK button BN11, and a cancel button BN12.

The user UA inputs user information regarding the authenticated print job, using the user authentication screen GB1 (see FIG. 12). To be specific, the user UA inputs a user ID (e.g., "UserA") in the entry field TM11 and a password (e.g., "1234") in the entry field TM12 and then presses the OK button BN11.

The computer 30 associates the user information LU1 (the login ID and the password) that has been input in the entry fields TM11 and TM12 with print data to be printed, and generates authenticated print job data DJ1. The authenticated print job data DJ1 includes print data (data for printout) DP1 and the user information (the input information for user authentication) LU1.

The computer 30 then transmits the authenticated print job data DJ1 to the MFP 10b. The MFP 10b (the job accepting unit 14) receives the authenticated print job data DJ1 and accepts an authenticated print job based on the authenticated print job data DJ1 (see FIG. 6).

When it is determined in step S13 (FIG. 3) that the MFP 10b has accepted an authenticated print job, the processing proceeds from step S13 to step S14.

In step S14, the MFP 10b (the determination unit 15) analyzes the accepted authenticated print job and specifies (determines) the type of specific information JM required to execute the job (the authenticated print job). The information JM is information related to the accepted job and is thus also referred to as "job-related information." Specifically, the MFP 10b (the determination unit 15) determines that the type of the job is an authenticated print job. The authenticated print job requires user authentication, and therefore "user information" (specifically, user information JM1 regarding the user UA (the user identified by the user ID stored in the authenticated print job data DJ1)) is determined as the type of the job-related information JM required to execute the authenticated print job. Although the present embodiment describes a mode in which the user information JM1 includes only user information regarding the specific user UA (the specific user information), the present invention is not limited thereto, and the user information JM1 may include other user information regarding users other than the user UA. It is, however, preferable that a relatively small amount of information (e.g., only the user information regarding the specific user UA) be transmitted and received as the job-related information JM in order to reduce the communication time to transmit the job-related information JM (see FIG. 8).

In step S15, the MFP 10b (the acquisition unit 16) determines whether or not the "user information of the user UA" (the job-related information JM) has already been imported from the MFP 10a into the MFP 10b through the above import processing.

If the "user information of the user UA" has already been imported into the MFP 10b, it is determined that the authenticated print job can be executed using the imported "user information of the user UA." The processing thus proceeds from step S15 to step S20, in which the authenticated print job is executed.

On the other hand, if the "user information of the user UA" has not yet been imported, the processing proceeds from step S15 to step S17. In step S17, the MFP 10b transmits a transmission request RQ1 to preferentially transmit the "user information of the user UA" (the job-related information JM), to the MFP 10a (the transmission source apparatus (i.e., the apparatus on the export side)) via the network NW (see FIG. 7). This causes the operation of acquiring the job-related information JM to be started.

Figure 8:
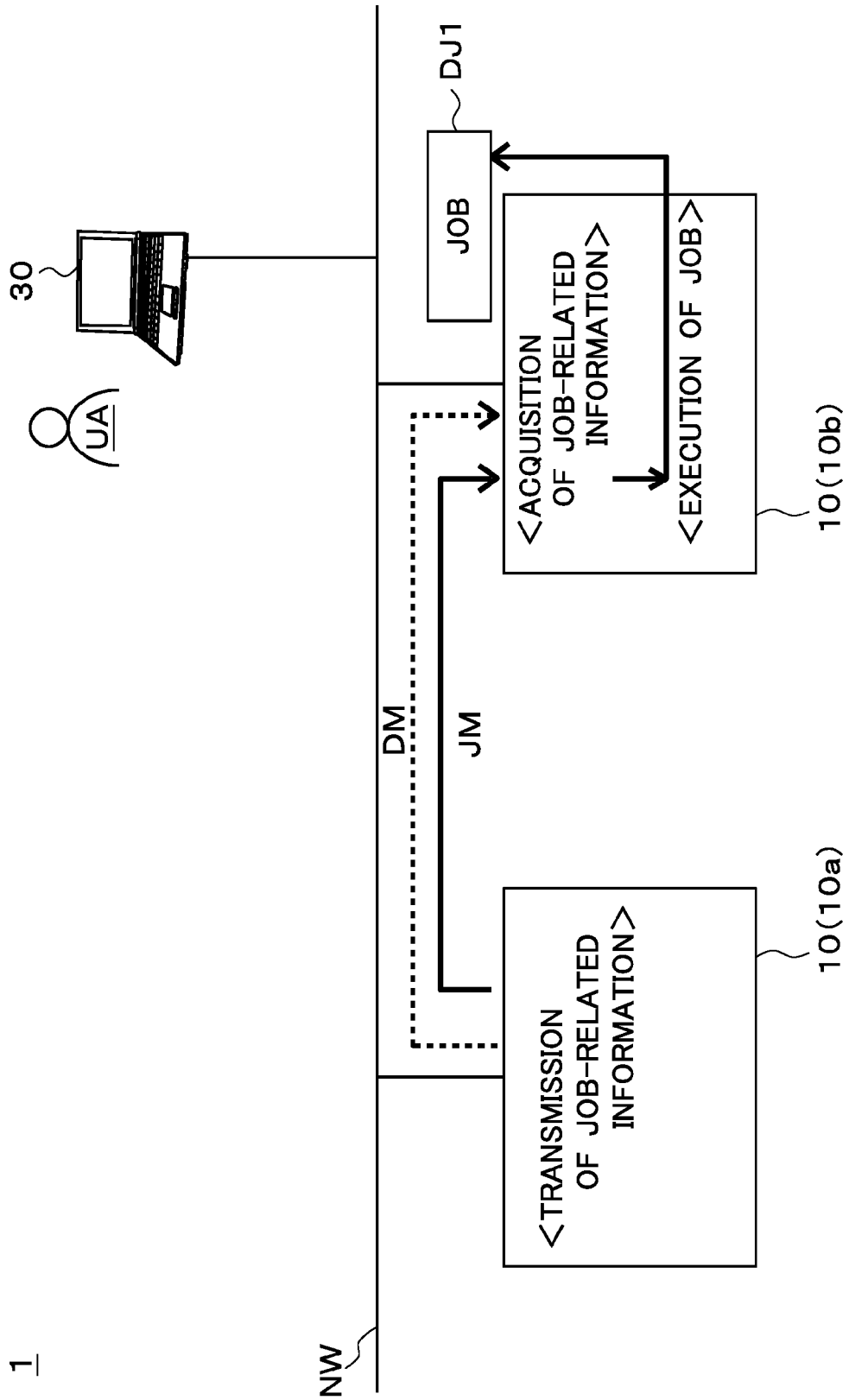
FIG. 8 illustrates a flow of data in the system.

Meanwhile, the MFP 10a extracts the "user information of the user UA" from the data for synchronization DM stored therein and transmits the user information of the user UA (the job-related information JM) preferentially over the other data included in the data for synchronization DM that has not yet been transmitted, to the MFP 10b via the network NW (see FIG. 8).

To be more specific, as shown in FIG. 4, if it is determined in step S32 that the MFP 10a has received the transmission request RQ1 from the MFP 10b, the processing proceeds to step S33, in which it is determined whether or not the data (the "user information of the user UA") requested in the transmission request RQ1 is present within the MFP 10a. If the requested data is present within the MFP 10a, the MFP 10a interrupts the transmission of the import data DM (step S34), extracts the requested data (the "user information of the user UA") from the data for synchronization DM, and transmits the extracted data to the MFP 10b (the request source apparatus) (step S35). When the transmission of the requested data (the "user information of the user UA") is complete, the MFP 10a resumes the transmission of the import data DM (step S36). The processing then proceeds from step S36 to step S38.

If the requested data is not present within the MFP 10a, the processing proceeds from step S33 to step S37. For example, if a unauthenticated user ID (e.g., an unregistered ID or a wrong user ID) is input in the user authentication screen GB1 of the computer 30, it is determined that the requested data (e.g., user information regarding an unregistered user or a wrong user ID of the user UA) is not present within the MFP 10a. In step S37, the MFP 10a transmits a notification indicating that the requested data (the "requested user information") cannot be transmitted (transmission is not possible), to the MFP 10b (the request source apparatus). The processing then proceeds from step S37 to step S38.

In step S38, it is determined whether or not the transmission of the import data is completed. If there is still unsent data, the processing returns again to step S32, and the transmission of the import data is continued.

The processing on the MFP 10a side is performed as described above. Through this processing, the MFP 10a extracts the "user information of the user UA" from the data for synchronization DM stored therein and transmits the user information of the user UA preferentially over the other data included in the data for synchronization DM that has not yet been transmitted, to the MFP 10b via the network NW.

In response to this, the MFP 10b performs loop processing (response waiting processing) in which steps S18 and S19 (FIG. 3) are performed repeatedly, and waits for the receipt acquisition of the job-related information JM from the MFP 10a to complete.

Figure 11:
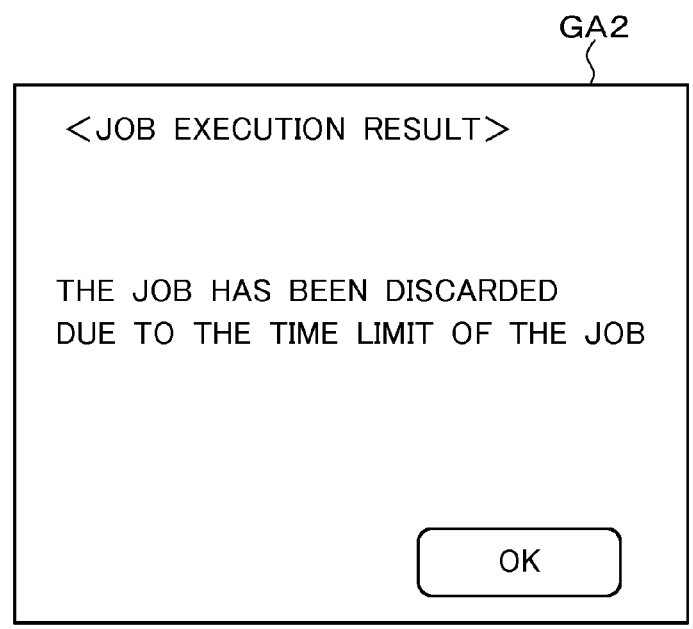
FIG. 11 shows a confirmation screen displayed when a job is discarded.

If the wait time (the length of the wait period from the start of the wait time) of the MFP 10b exceeds the time limit TR during the period of time (response wait period) in which the MFP 10b waits for a response from the MFP 10a, the processing proceeds from step S18 to step S21. In step S21, the MFP 10b cancels the above transmission request. To be more specific, the MFP 10b transmits a transmission cancellation instruction to cancel the transmission of the job-related information JM, to the MFP 10a and resumes the transmission of the import data. In step S21, the MFP 10b also discards the authenticated print job from the user UA and causes a confirmation screen GA2 as shown in FIG. 11 to be displayed on the display unit of the computer 30. In step S22, the import processing is resumed. As described above, the MFP 10b cancels the acquisition of the job-related information and resumes the import processing if the "user information of the user UA" (the job-related information JM) cannot be received from the MFP 10a within the time limit TR (from the start of the acquisition) in response to the transmission request RQ1. The processing then proceeds to step S23.

On the other hand, if the MFP 10b has acquired the "user information of the user UA" (the job-related information JM) before the wait time of the MFP 10b (the period of time in which the MFP 10b waits for a response from the MFP 10a, i.e., the response wait period) exceeds the time limit TR, the processing proceeds to step S20.

In step S20, the MFP 10b executes the authenticated print job on the basis of the received "user information of the user UA" (the job-related information JM). The "user information (JM1) of the user UA" received from the MFP 10a includes the user ID (an authenticated user ID) and password (an authenticated password) of the user UA. The user information of the user UA may further include, for example, information indicating whether each operation is permitted or prohibited (e.g., whether the copy operation is permitted or prohibited, and whether the scan operation is permitted or prohibited) for the user UA is permitted according to the type of the operation.

Specifically, the MFP 10b first performs user authentication processing in step S20. The user authentication processing is performed on the basis of the match between the job-related information JM received from the MFP 10a (specifically, the authenticated user information JM1 (the user ID and the password) of the user UA) and the user information LU1 (the user ID and the password) input by the user UA via the computer 30. If the authentication has succeeded, the authenticated print job (specifically, printout processing based on the print data DP1 in the authenticated print job data DJ1) is executed. If the authentication has failed, the authenticated print job is not executed.

Figure 9:
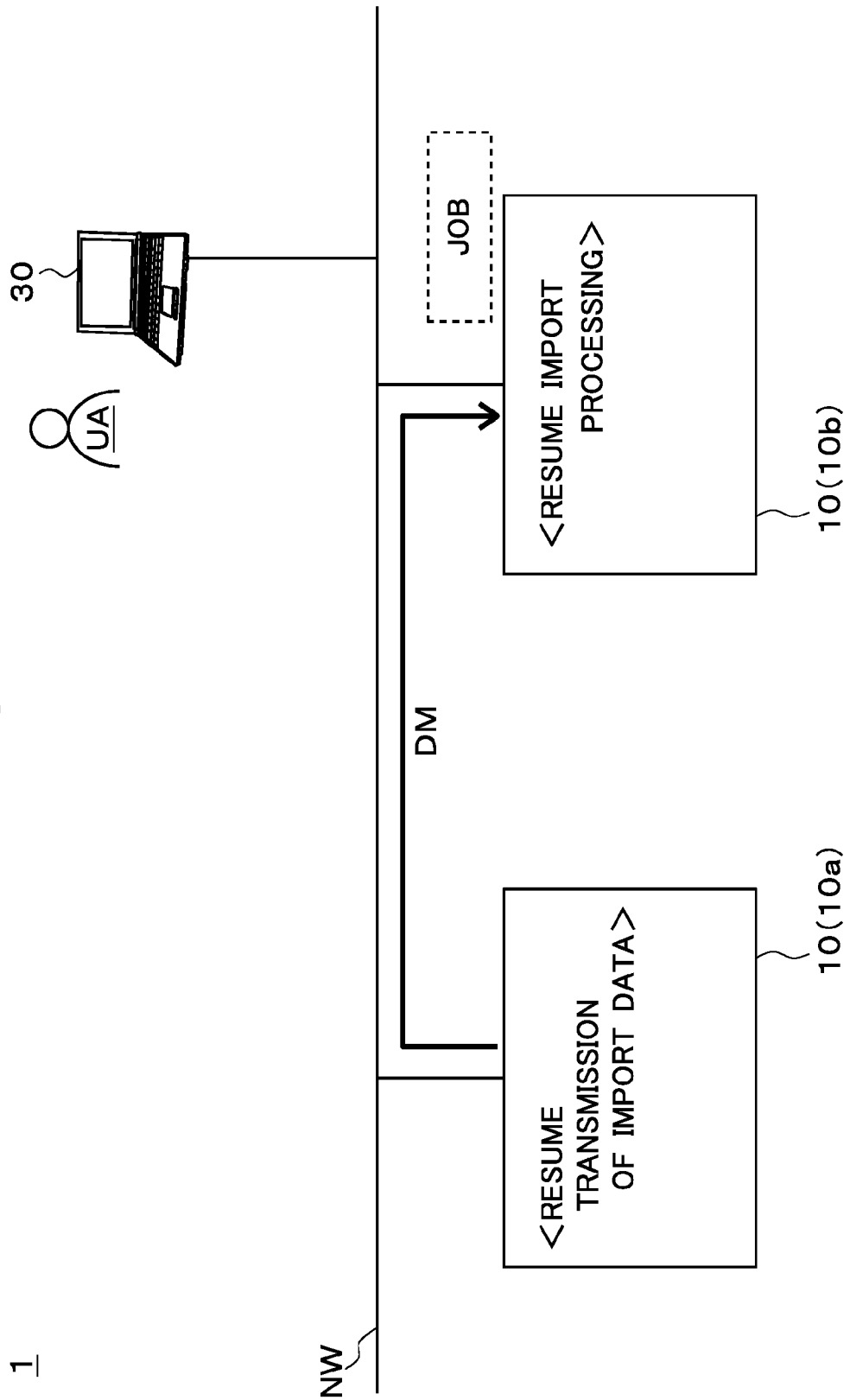
FIG. 9 illustrates a flow of data in the system.

After that, the MFP 10b resumes the import processing (step S22) (see also FIG. 9). The MFP 10b continues the import processing (e.g., processing for receiving the import data and processing for storing the received import data) until it is determined in step S23 that the import processing is completed. Likewise, as shown in FIG. 4, the MFP 10a also continues the transmission of the import data (or export data when viewed from the MFP 10a) DM until it is determined in step S38 that the transmission of the import data is completed.

According to the operations described above, when an authenticated print job is accepted by the MFP 10b during the import processing, the MFP 10b first determines the type of the specific information (job-related information) JM required to execute the authenticated print job from among the information included in the import data DM (step S14). Next, the MFP 10b acquires the job-related information JM of the determined type preferentially from the MFP 10a without waiting for completion of the import processing (specifically, after the start of the import processing and before the completion of the import processing) (steps S15 to S19). In particular, the MFP 10b preferentially acquires the user information JM1 (job-related information) from among the import data DM in a situation in which the user information JM1 has not yet been imported into the MFP 10b. To be more specific, the user information JM1 is acquired preferentially (preferentially over the other information) from among information that is included in the import data DM but has not yet been imported into the MFP 10b. The MFP 10b then executes the authenticated print job, using the acquired job-related information JM (specifically, the user information JM1 of the user UA) (step S20). Accordingly, the MFP 10b can preferentially execute the authenticated print job that requires the user information JM1, without waiting for the completion of the import processing. In this way, the job-related information that is preferentially acquired from the storage apparatus before completion of the import processing is used to execute a job. It is thus possible to execute the job without waiting for the completion of the import processing.

In particular, the job-related information JM that has not yet been imported from the MFP 10a into the MFP 10b is acquired from the MFP 10a. To be specific, the MFP 10b confirms that the job-related information JM has not yet been imported into the MFP 10b, transmits the transmission request RQ1 for the job-related information JM to the MFP 10a, and acquires the job-related information JM from the MFP 10a. In other words, the job-related information JM that has already been imported into the MFP 10b will not be transmitted from the MFP 10a to the MFP 10b (separately from the import data DM). It is thus possible to avoid redundant transmission of the job-related information JM.

When the response wait period after receipt of the transmission request for the job-related information exceeds the time limit TR (specifically, when the job-related information JM cannot be received from the MFP 10a within the predetermined time limit TR in response to the transmission request RQ1), the acquisition of the job-related information JM is canceled and the import processing is resumed. This prevents an excessively long delay of the completion of the import processing.

While the present embodiment describes a mode in which the MFP 10a transmits the import data DM to the MFP 10b in response to the transmission request from the MFP 10b, the present invention is not limited thereto. For example, the MFP 10a may transmit the import data DM to the MFP 10b without receiving a transmission request from the MFP 10b. To be specific, the MFP 10a may transmit a notification to start transmission to the MFP 10b and transmit import data in response to receipt of a notification indicating the completion of preparation from the MFP 10b.

While the present embodiment describes a mode in which the data for synchronization (import data) DM is transmitted from the old MFP 10a to the new MFP 10b, the present invention is not limited thereto. Specifically, the idea described above is also applicable to synchronization of various types of information (e.g., setting information) among a plurality of MFPs 10a, 10b, 10c, and 10d (whether the MFPs are new or old does not matter). For example, the above idea is also applicable to a case in which the MFP(s) 10a, 10b, and/or 10d receive(s) modified data for synchronization (import data) DM from another MFP 10c that has accepted changes to various types of information, and perform(s) import processing on the basis of the import data DM.

While the present embodiment describes a mode in which the import data DM is stored in the MFP 10a (the storage apparatus) and the MFP 10b acquires the import data DM from the MFP 10a, the present invention is not limited thereto. For example, the above idea may be applied to a case in which import data DM is imported from another storage apparatus (e.g., the computer 30 or 50) in which the import data DM is stored, into the MFP 10b.

2. Second Embodiment

A second embodiment is a variation on the first embodiment. The following description focuses on differences from the first embodiment.

The second embodiment describes a mode (see FIG. 13) in which the MFP 10b acquires the job-related information JM (JM21 and JM22) in two stages from the MFP 10a during import processing, as will be described below.

Figure 16:
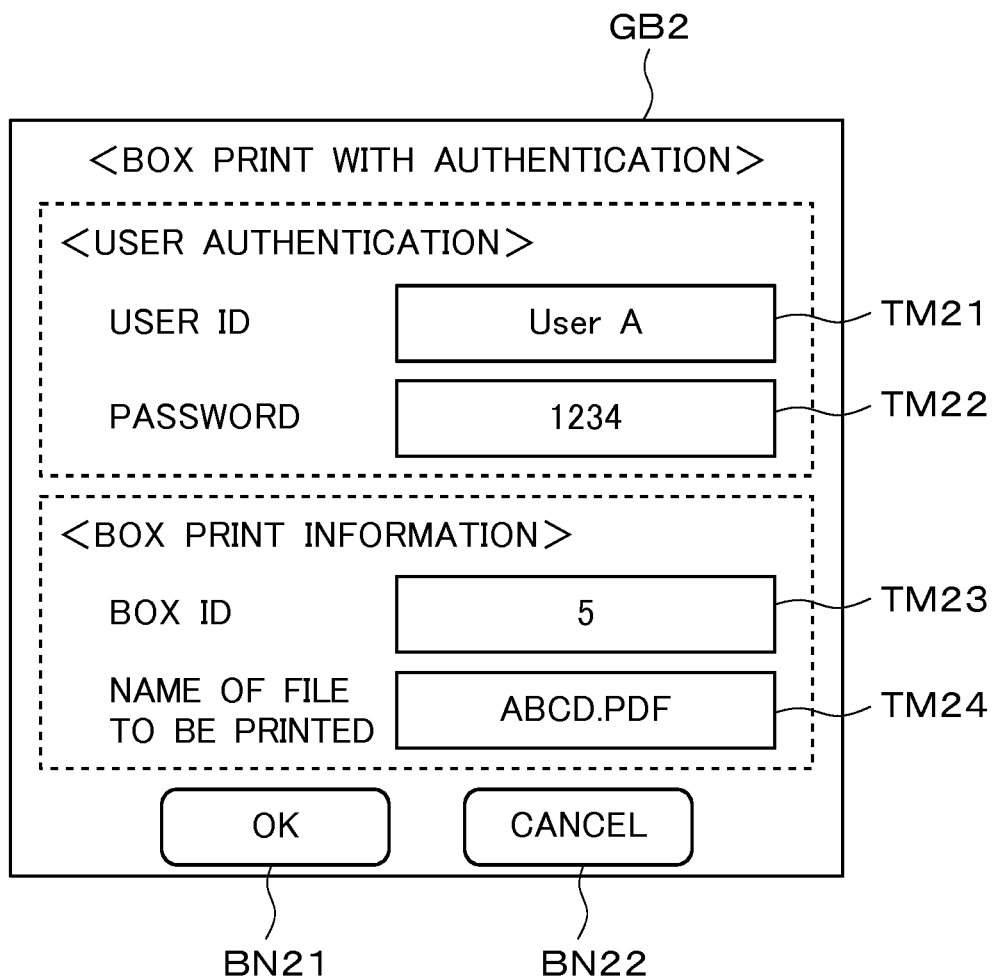
FIG. 16 shows a setting screen used in a box print job.

In the second embodiment, it is assumed that the MFP 10b accepts a box print job from the computer 30 via the network NW while receiving the import data DM from the MFP 10a. The box print job is given from the computer 30 in the following manner. Specifically, the user UA instructs the MFP 10b to execute a box print job via the computer 30, using a setting screen GB2 as shown in FIG. 16. Here, the box print job is a job for printing out a data file (an in-box file) stored in a box of an MFP 10 and is also called a job (a box-related job) that involves access to a file stored in the box of the MFP 10. Here, a box print job that involves user authentication is shown as an example of the box print job.

FIG. 16 shows the setting screen GB2 used in the box print job. The setting screen GB2 is displayed on the display unit of the computer 30. As shown in FIG. 16, the setting screen GB2 includes entry fields TM21 to TM24, an OK button BN21, and a cancel button BN22.

The user UA inputs the user ID (e.g., "UserA") in the entry field TM21 and the password (e.g., "1234") in the entry field TM22, and also inputs box print information. Specifically, a box ID (e.g., "5") is input in the entry field TM23, and a filename of a file to be printed (e.g., "ABCD.PDF") is input in the entry field TM24. The user UA then presses the OK button BN21.

The computer 30 associates user information LU2 (the login ID and the password) input in the entry fields TM21 and TM22 with box information LB2 (the box ID and the filename of the file to be printed) that has been input in the entry fields TM23 and TM24, and generates box print job data DJ2. The generated box print job data DJ2 is transmitted from the computer 30 to the MFP 10b, and thereby the box print job is given to the MFP 10b.

Figure 14:
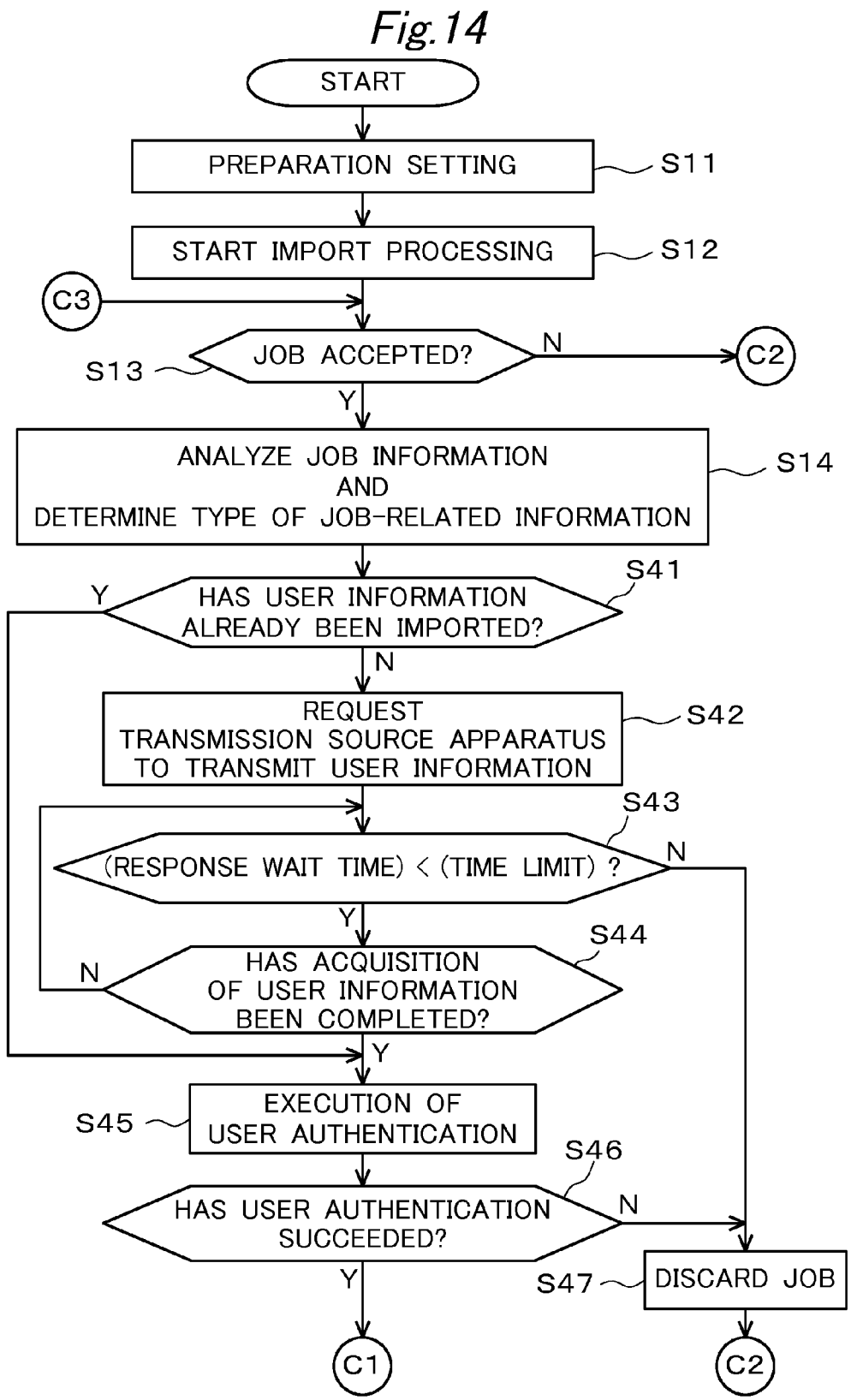
FIG. 14 is a flowchart of operations performed by the MFP (the apparatus on the import side) according to the second embodiment.
Figure 15:
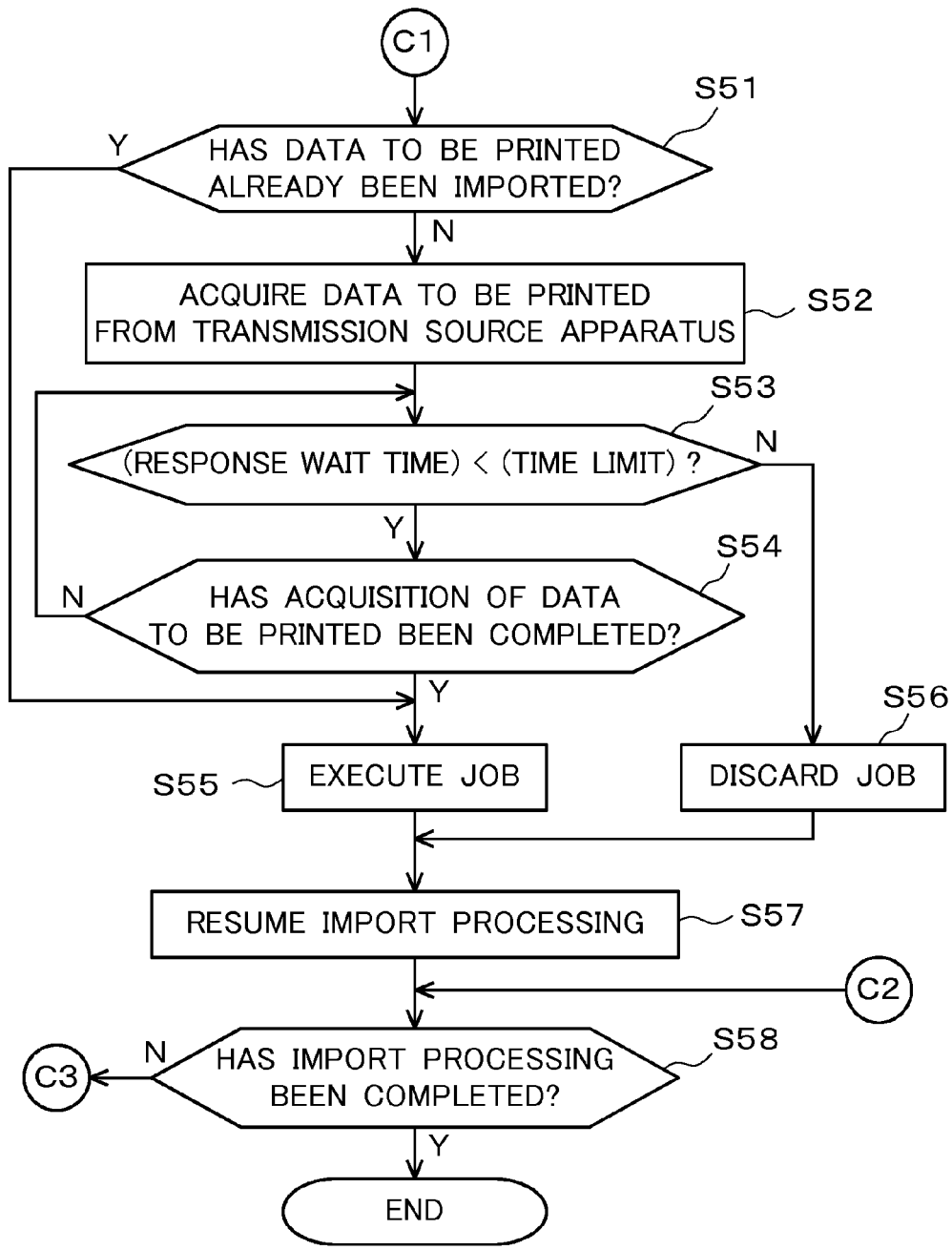
FIG. 15 is a flowchart of operations performed by the MFP (the apparatus on the import side) according to the second embodiment.

FIGS. 14 and 15 illustrate a flowchart of operations performed by the MFP 10b according to the second embodiment.

The processing of steps S11 to S14 is the same as that in the first embodiment.

However, the job accepted in step S13 of the second embodiment is a box print job that is given from the computer 30 to the MFP 10b as mentioned above.

In step S14 of the second embodiment, user information JM21 and box information JM22 are determined as the job-related information JM. To be specific, the user information JM21 is user information of the user UA. The box information JM22 is specific information related to a box and includes data indicating a file to be printed (an in-box file) "ABCD.PDF" and the box ID "5" of the box in which the file to be printed is stored. In short, the box information JM22 is data of the file "ABCD.PDF" to be printed (data to be printed) that is stored with the box ID "5." The present invention is, however, not limited to this, and the box information JM22 may include other information (e.g., data regarding other files stored in the box with the box ID "5"). It is, however, preferable that a relatively small amount of information be transmitted and received as the job-related information JM in order to reduce the communication time to transmit the job-related information JM.

Figure 13:
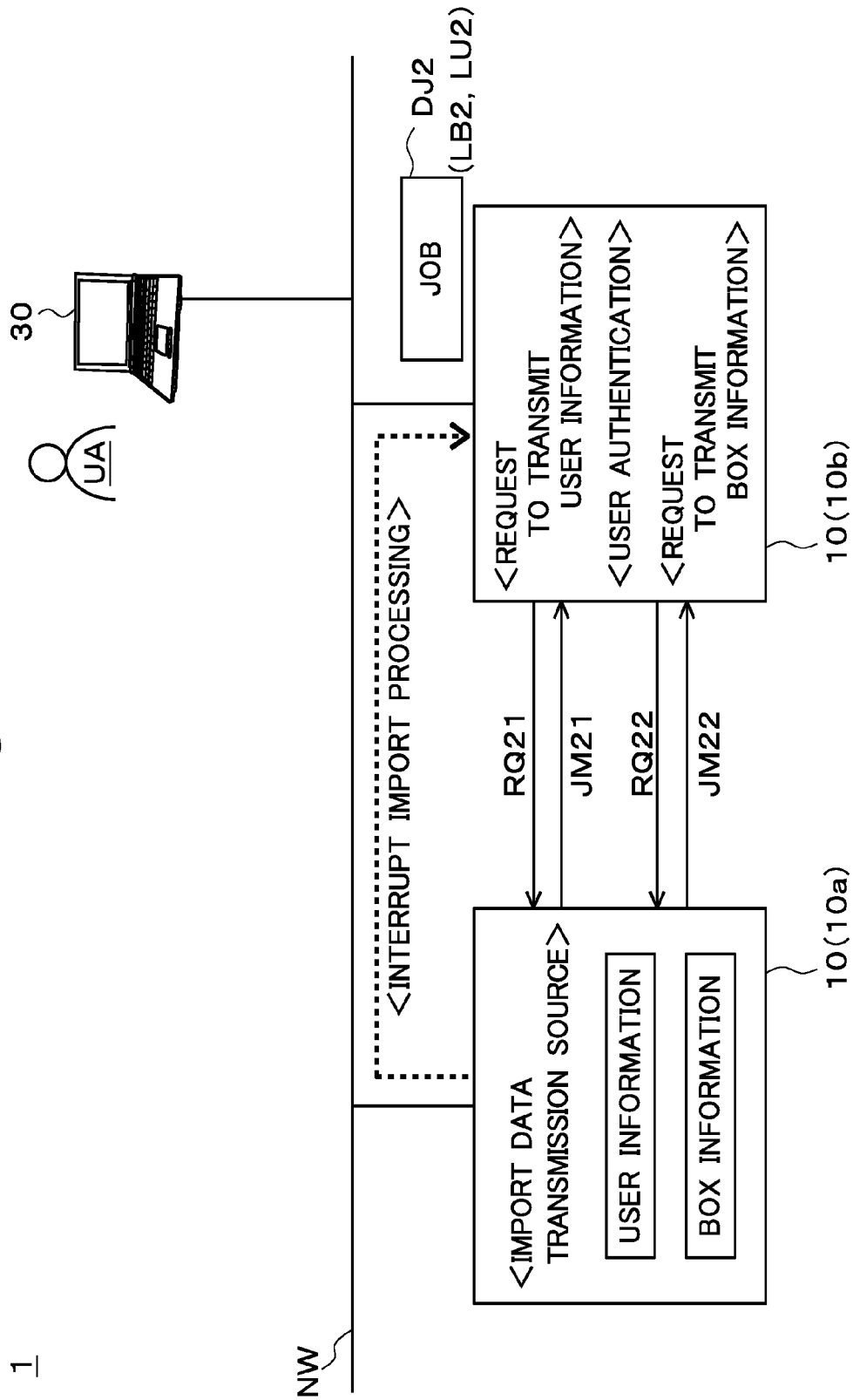
FIG. 13 is a conceptual diagram illustrating a system according to a second embodiment.

In the second embodiment, the MFP 10b acquires the job-related information JM in two stages from the MFP 10a as shown in FIG. 13. Specifically, the job-related information JM is divided into two information pieces, namely, the user information JM21 and the box information JM22, and is acquired in stages by the MFP 10b. To be specific, the user information JM21 is acquired in steps S41 to S44 and then the box information JM21 is acquired in steps S51 to S54 on condition that user authentication processing using the user information JM21 succeeds.

In steps S41 to S44 following step S14, the user information JM21 is acquired from among the two information pieces JM21 and JM22. Specifically, it is first determined whether or not the user information JM21 has already been imported into the MFP 10b (step S41). If it is determined that the user information JM21 has already been imported, the processing proceeds immediately to step S45. On the other hand, if it is determined that the user information JM21 has not yet been imported, a transmission request RQ21 (see FIG. 13) to transmit the user information JM21 is provided to the MFP 10a (the transmission source apparatus) (step S42). In response to the transmission request RQ21, the MFP 10a transmits the user information JM21 toward the MFP 10b. Meanwhile, the MFP 10b performs response waiting processing in steps S43 and S44. If the time limit TR has expired without the MFP 10b acquiring the user information JM21, the processing proceeds to step S47. In step S47, processing for discarding the job is performed as in step S21 (FIG. 3). If the user information JM21 is acquired within the time limit TR, the processing proceeds to step S45.

In step S45, user authentication processing is performed. The user authentication processing is performed on the basis of the match between the "authenticated user information JM21 (the user ID and the password) of the user UA" received from the MFP 10a and the user information LU2 (the user ID and the password) input by the user UA via the computer 30. If the user authentication processing has failed, the processing proceeds from step S46 to step S47. On the other hand, if the user authentication processing has succeeded, the processing proceeds from step S46 to step S51 (in FIG. 15).

In steps S51 to S54, the box information JM22 is acquired from among the two information pieces JM21 and JM22. Specifically, it is first determined whether or not the box information JM22 has already been imported into the MFP 10b (step S51). If it is determined that the box information JM22 has already been imported, the processing proceeds immediately to step S55. On the other hand, if it is determined that the box information JM22 has not yet been imported, a transmission request RQ22 (see FIG. 13) to transmit the box information JM22 is provided to the MFP 10a (the transmission source apparatus) (step S52). In response to the transmission request RQ22, the MFP 10a transmits the box information JM22 toward the MFP 10b. Meanwhile, the MFP 10b performs response waiting processing in steps S53 and S54. If the time limit TR has expired without the MFP 10b acquiring the box information JM22, the processing proceeds from step S53 to step S56. In step S56, processing for discarding the job is performed as in step S21 (FIG. 3). On the other hand, if the box information JM22 is acquired within the time limit TR, the processing proceeds from step S54 to step S55. In the present embodiment, the response wait period in step S53 is measured from the start time of acquisition of the box information JM22 (step S51), but the present invention is not limited to this, and the response wait period may be measured from the start time of acquisition of the user information JM21 (step S41).

In step S55, the remaining processing in the box print job is performed. The user authentication processing in the box print job has ended in step S45. Thus, printout processing subsequent to the authentication is performed in step S55. More specifically, the printout processing is performed on the basis of the box information JM22.

After that, the import processing is resumed (step S57). The import processing (e.g., the processing for receiving import data and the processing for storing the received import data) is continued until it is determined in step S58 that the import processing is completed.

As described above, in the second embodiment, when a box print job is accepted during the import processing, the MFP 10b first determines the type of the specific information (job-related information) JM required to execute the box print job among the information included in the import data DM (step S14). Specifically, the two information pieces JM21 and JM22 are determined as the job-related information JM.

Next, the MFP 10b acquires only one of the two information pieces JM21 and JM22, namely, the job-related information JM21, from the MFP 10a (steps S41 to S44). Then, the MFP 10b executes the box print job, using the job-related information JM (specifically, the user information JM21 of the user UA) (step S45). The MFP 10b can thus acquire the desired information JM21 without waiting for the completion of the import processing and perform the user authentication processing, which is upstream processing in the box print job.

The MFP 10b further acquires the remaining one of the two information pieces JM21 and JM22, namely, the job-related information JM22, from the MFP 10a (steps S51 to S54). Then, the MFP 10b executes the box print job, using the job-related information JM (specifically, the box information JM22) (step S55). The MFP 10b can thus acquire the desired information JM22 without waiting for the completion of the import processing and perform the printout processing, which is downstream processing in the box print job.

In this way, the user authentication processing is performed by first acquiring only the job-related information (user information) JM21 from among the job-related information JM. Then, only when the user authentication processing has succeeded, the continuation of the job is permitted in accordance with the result of the user authentication processing, and the box information JM22 is further acquired to complete the job. Accordingly, when the user authentication processing has failed, it is unnecessary to perform the operation of receiving (acquiring) the box information JM22. In other words, it is possible to eliminate the need to perform a useless information acquisition operation, and to improve the efficiency of processing.

While the above second embodiment describes a mode in which the user authentication information JM21 is first acquired when the job-related information JM that is a combination of the user authentication information JM21 and other information (specifically, the box information JM22) is acquired, the present invention is not limited to this.

For example, when job-related information that is a combination of user information, address information, and other information (specifically, box information) is acquired, the user information and the address information may be acquired first.

Figure 17:
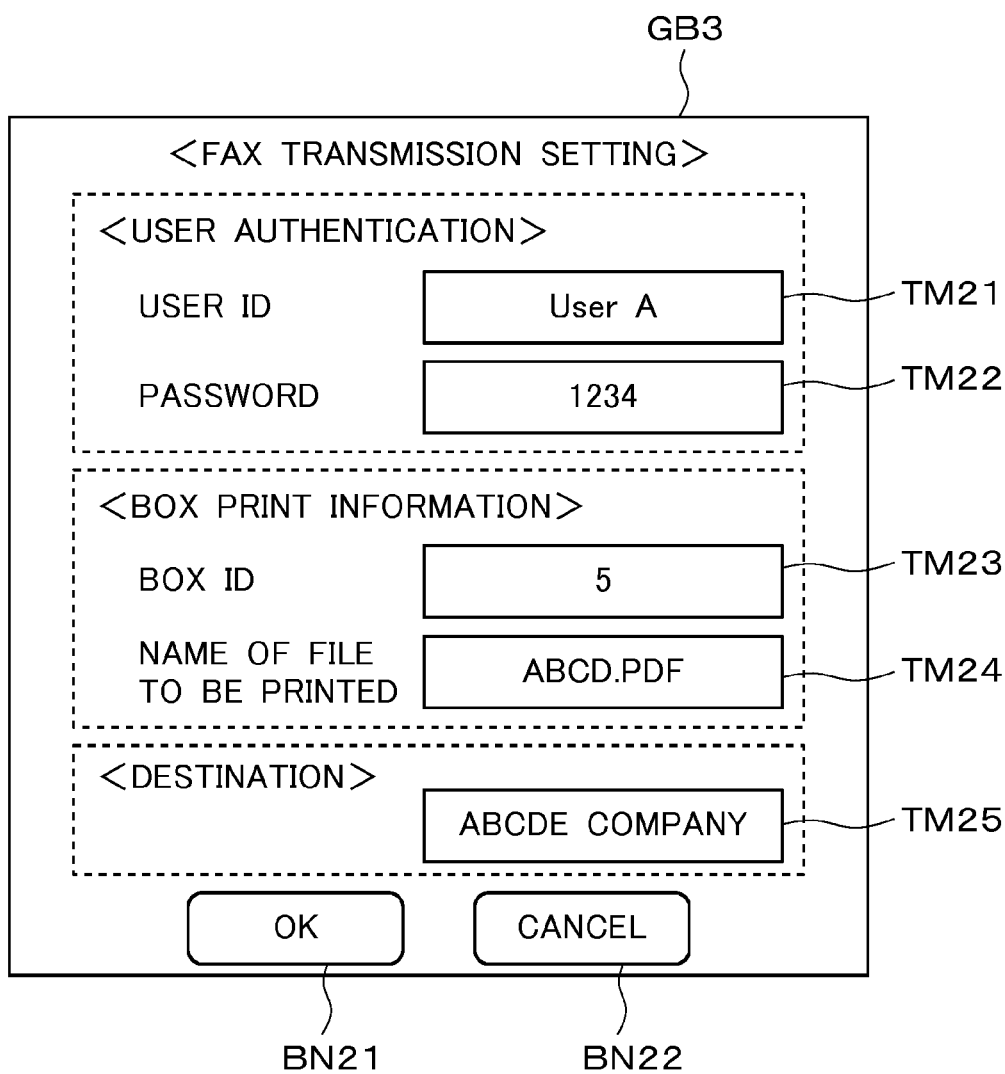
FIG. 17 shows a setting screen of a fax driver.

To be more specific, using a setting screen GB3 (FIG. 17) of a fax driver in the computer 30, the user UA inputs the user information and the box information in the entry fields TM21 to TM24 and the name of the fax destination (e.g., the "ABCDE company") in an entry field TM25, and then presses the OK button BN21.

The computer 30 associates various types of information input in the entry fields TM21 to TM25 with one another and generates fax job data DJ2b for use in transmitting a data file in a box by facsimile. The generated fax job data DJ2b is transmitted from the computer 30 to the MFP 10b, and thereby a fax job is provided to the MFP 10b. The fax job is a job for transmitting (transmitting and outputting) a file stored in a box of the MFP 10 by facsimile and is also referred to as a job that involves access to the file stored in the box (a box-related job).

When such a fax job is received during the import processing, the user information JM21, the box information JM22, and the address information JM23 may be determined as the job-related information JM, the user information JM21 and the address information JM23 may be acquired in first acquisition processing, and the remaining box information JM22 may be acquired in second acquisition processing. Here, the address information JM23 is address information regarding the destination "ABCDE Company".

To be more specific, it is sufficient to first acquire the user information JM21 and the address information JM23 and then acquire the remaining box information JM22 after it has been confirmed that the user UA has the right to access the destination "ABCDE company" (reference right to the destination). In this case, if for example, the user UA does not have the right to access the destination "ABCDE company," it is unnecessary to perform the operation of acquiring the remaining box information JM22 (e.g., a data file). In other words, it is possible to eliminate the need to perform a useless information acquisition operation, and to improve the efficiency of processing.

3. Third Embodiment

A third embodiment is a variation on the first embodiment. The following description focuses on differences from the first embodiment.

The third embodiment describes a mode in which the MFP 10b accepts a box registration job via the operation panel unit 6c (FIG. 1) of the MFP 10b while receiving the import data DM from the MFP 10a. The box registration job is a job for registering a new box (in the MFP 10b). To be specific, new box information is registered with an unassigned box ID.

Figure 18:
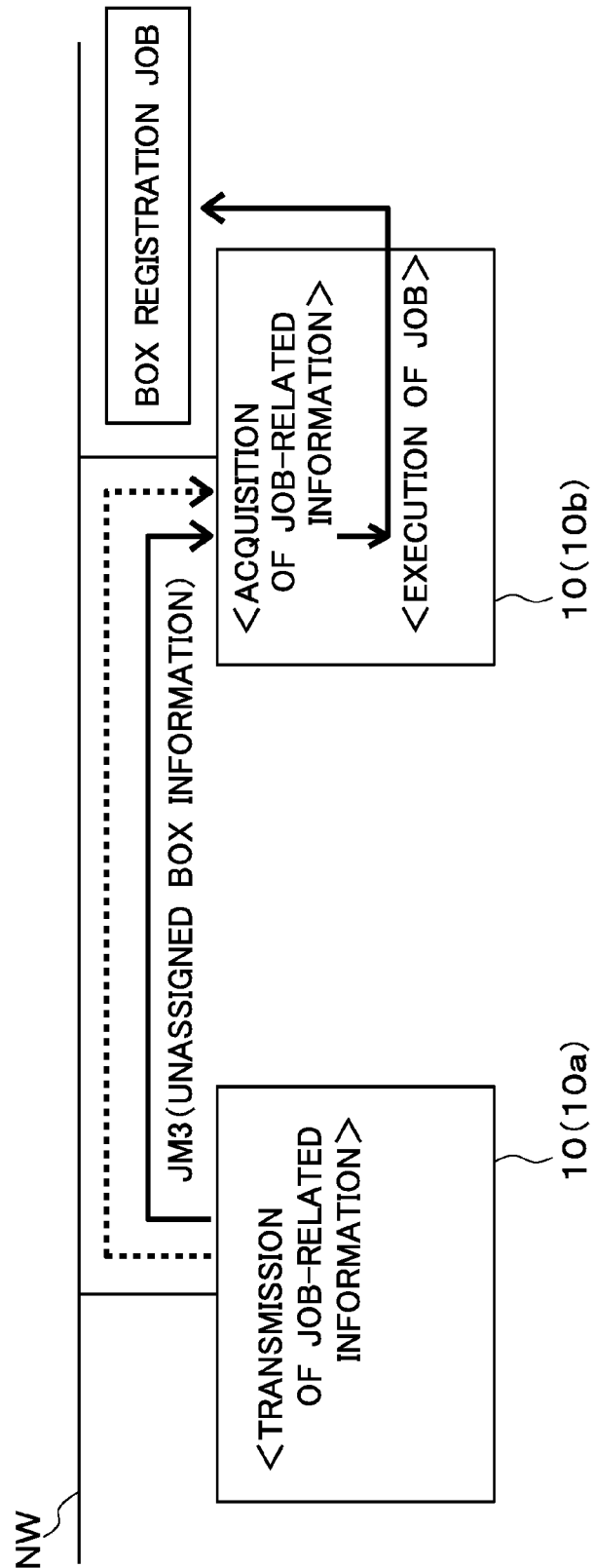
FIG. 18 is a conceptual diagram illustrating a system according to a third embodiment.

Specifically, information regarding an unassigned box ID (unassigned box ID information) is determined as the job-related information JM, and a transmission request RQ (RQ3) to transmit the unassigned box ID information is sent from the MFP 10b to the MFP 10a. In response to the transmission request RQ3, the MFP 10a transmits the unassigned box ID information JM (JM3) to the MFP 10b (see FIG. 18). The MFP 10b executes the box registration job on the basis of the received unassigned box ID information JM3. Note that the unassigned box ID information JM3 can be also said to be free-space information regarding box IDs (information indicating unassigned box IDs).

FIG. 20 illustrates a box registration status in the MFP 10a (the transmission source apparatus). FIG. 20 shows the status in which information has been registered with box IDs "1" to "3," "5," and "6" among a plurality of box IDs, whereas no information has been registered with a box ID "4."

If this box information has already been imported into the MFP 10b (the import destination apparatus), the MFP 10b can make new box registration with the unassigned box ID while taking into consideration the box registration status in the MFP 10a. On the other hand, if the box information has not yet been imported into the MFP 10b, the MFP 10b cannot take the registration status of the MFP 10a into consideration. Thus, for example, if the MFP 10b makes new registration with a box ID having the same number as that already used in the MFP 10a, the content of the new registration by the MFP 10b will be lost by overwrite processing performed in the subsequent processing of importing the import data DM from the MFP 10a.

In view of this, the third embodiment describes a technique that allows a box registration job to be executed appropriately even in such a situation in which the transmission of the import data DM has not yet been completed and the box information in the import data DM has not yet been imported into the MFP 10b.

Figure 19:
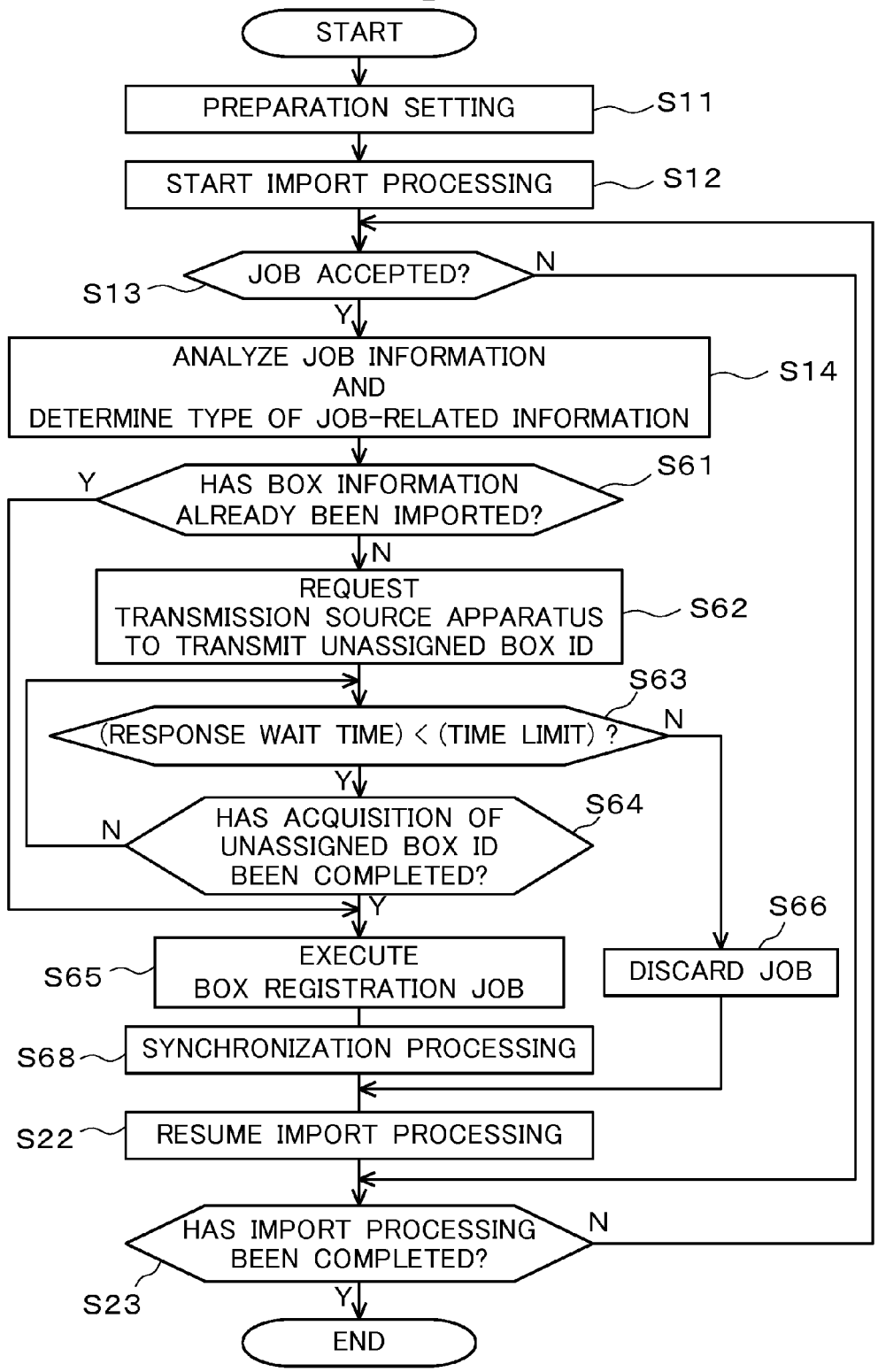
FIG. 19 is a flowchart of operations performed by the MFP (the apparatus on the import side) according to the third embodiment.

FIG. 19 is a flowchart of operations performed by the MFP 10b according to the third embodiment. The MFP 10b of the third embodiment performs operations similar to those of the MFP 10b of the first embodiment, as shown in FIG. 19.

To be specific, after steps S11 and S12, a box registration job as mentioned above is accepted in step S13. Next, in step S14, "unassigned box ID information" is determined as the type of the specific information (job-related information) JM required to execute the box registration job. In step S61, it is determined whether or not the "unassigned box ID information" has already been imported into the MFP 10b. If the "unassigned box ID information" has already been imported, the processing proceeds to step S65, and if the "unassigned box ID information" has not yet been imported, the processing proceeds to step S62. In step S62, the unassigned box ID information is requested to the MFP 10a. In response to this, the unassigned box ID information is preferentially transmitted from the MFP 10a to the MFP 10b. After the acquisition of the unassigned box ID information has been completed, the processing proceeds from step S64 to step S65. In step S65, the MFP 10b executes the box registration job, using the acquired unassigned box ID information.

FIG. 21 shows a registration screen used in such a box registration job (step S65). As shown in FIG. 21, the already-assigned box IDs "1" to "3," "5," and "6" among a plurality of box IDs are grayed out (made disabled), and thus it is not possible to make registration with these box IDs. On the other hand, the box ID "4" that is not used in the MFP 10a is enabled, and thus it is possible to perform a box registration operation using the box ID "4." Specifically, when the "Edit" button (at the right edge) in the field of the box ID "4" is pressed, a more detailed registration screen is displayed to allow box registration using the box ID "4".

In this way, in the box registration job in step S65, the MFP 10b explicitly indicates unassigned box IDs on the basis of the unassigned box ID information acquired from the MFP 10a and permits new registration with only the unassigned box IDs among a plurality of box IDs.

After the execution of the box registration job has been completed, the newly registered content in the MFP 10b (the registered content of the box ID "4") is transmitted from the MFP 10b to the MFP 10a this time. The MFP 10a merges the newly registered content with the import data DM and updates the import data DM. The updated import data DM reflects the registered content of the new registration. Through this, appropriate data for synchronization (import data) DM to be used in the subsequent synchronization processing is prepared. In the subsequent synchronization processing (including the import processing resumed immediately after the job-related information JM has been acquired), the import data DM that reflects the registered content of the new registration (the registered content of the box ID "4") is imported into the MFP 10b.

If import data DM that does not reflect the content of the new registration (the registered content of the box ID "4") made on the MFP 10b side is transmitted back to the MFP 10b in the subsequent synchronization processing, the existing registered content of the box ID "4" will be overwritten by the MFP 10b with information indicating that the box ID "4" is unassigned. In other words, the above newly registered content (the registered content of the box ID "4") will be lost by the overwriting.

In contrast, if the newly registered content is transmitted to the MFP 10a and the import data DM is updated in step S68, such a situation (a loss of the registered content due to overwriting with unsynchronized data during import processing) can be prevented.

According to the above-described operations of the third embodiment, when a box registration job is accepted by the MFP 10b during import processing, the MFP 10b first determines the type (in the present example, the unassigned box ID information) of the specific information (job-related information) JM required to execute the box registration job. Next, the MFP 10b acquires the job-related information (unassigned box ID information) JM of the determined type from the MFP 10a. The MFP 10b then executes the box registration job, using the job-related information JM (the unassigned box ID information). Accordingly, the MFP 10b can appropriately execute the box registration job without waiting for the completion of the import processing.

4. Fourth Embodiment

A fourth embodiment is a variation on the third embodiment. The following description focuses on differences from the third embodiment.

The above third embodiment describes a mode in which the idea of the present invention is applied to a box registration job.

The fourth embodiment describes a mode in which the same idea is applied to an address registration job for registering various types of addresses (e.g., e-mail addresses, transmission destination addresses in SMB communication, transmission destination addresses in FTP communication, and facsimile transmission destination addresses (telephone numbers)).

Figure 22:
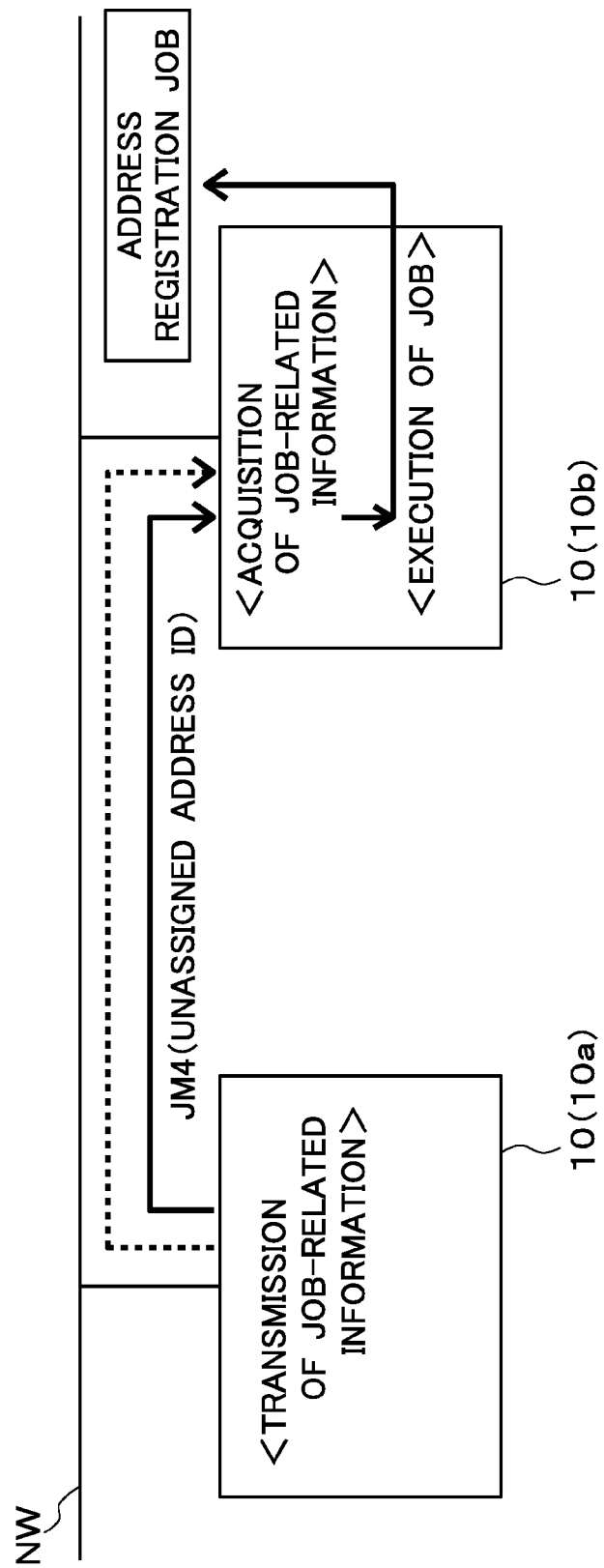
FIG. 22 is a conceptual diagram illustrating operations according to a fourth embodiment.

FIG. 22 is a conceptual diagram illustrating operations according to the fourth embodiment. Specifically, as illustrated in FIG. 22, an "unassigned address ID" (unassigned address ID information) may be determined as the job-related information JM, instead of the "unassigned box ID" in the third embodiment.

In the fourth embodiment, operations similar to those in FIG. 19 are performed. The MFP 10b displays an address registration screen (not shown), instead of the box registration screen in FIG. 21, and performs an address registration operation using an unassigned address ID.

After the address registration job has been completed, the content newly registered by the MFP 10b (e.g., the registered content of the address ID "4") is transmitted from the MFP 10b to the MFP 10a this time. The MFP 10a merges the registered content with the import data DM and updates the import data DM. Through this, the data for synchronization (import data) DM to be used in the subsequent synchronization is prepared. Then, import data (synchronized data) that reflects the content newly registered by the MFP 10b is imported into the MFP 10b. It is thus possible to prevent a loss of the registered content due to overwriting using unsynchronized data during the import processing.

According to this embodiment, when an address registration job is accepted by the MFP 10b during import processing, the MFP 10b first determines the type (in the present example, the unassigned address ID information) of the specific information (job-related information) JM required to execute the address registration job. Next, the MFP 10b acquires the job-related information (the unassigned address ID information) JM of the determined type from the MFP 10a. Then, the MFP 10b executes the address registration job, using the job-related information JM (the unassigned address ID information). To be specific, the MFP 10b explicitly indicates unassigned address IDs on the basis of the unassigned address ID information acquired from the MFP 10a and permits new registration with only the unassigned address IDs among a plurality of address IDs. In this way, the MFP 10b can appropriately execute the address registration job without waiting for the completion of the import processing.

While the fourth embodiment describes a mode in which the same idea as that in the third embodiment is applied to an address registration job, the present invention is not limited thereto. For example, the same idea as that in the third embodiment (or the fourth embodiment) may be applied to a user registration job. In this case, an "unassigned user ID" (unassigned user ID information) may be determined as the job-related information JM, instead of the "unassigned box ID." Also, new registration with the unassigned user ID may be permitted on the basis of the unassigned user ID information. Furthermore, the newly registered content of the unassigned user ID in the MFP 10b may be reflected to the import data DM in the MFP 10a (the transmission source apparatus), and the import data DM that reflects the newly registered content may be imported from the MFP 10a into the MFP 10b.

5. Fifth Embodiment

A fifth embodiment is a variation on the first embodiment. The following description focuses on differences from the first embodiment.

The first and other embodiments describe a mode in which a job is accepted during import processing.

The fifth embodiment describes a mode in which a job (reservation) is accepted before the start of import processing, and this job is executed in response to an instruction to start the import processing. When executing the job, the MFP 10b acquires specific job-related information JM required to execute the job, in advance from among the import data DM. This allows the MFP 10b to execute the job relatively early without waiting for the completion of the import processing.

Figure 23:
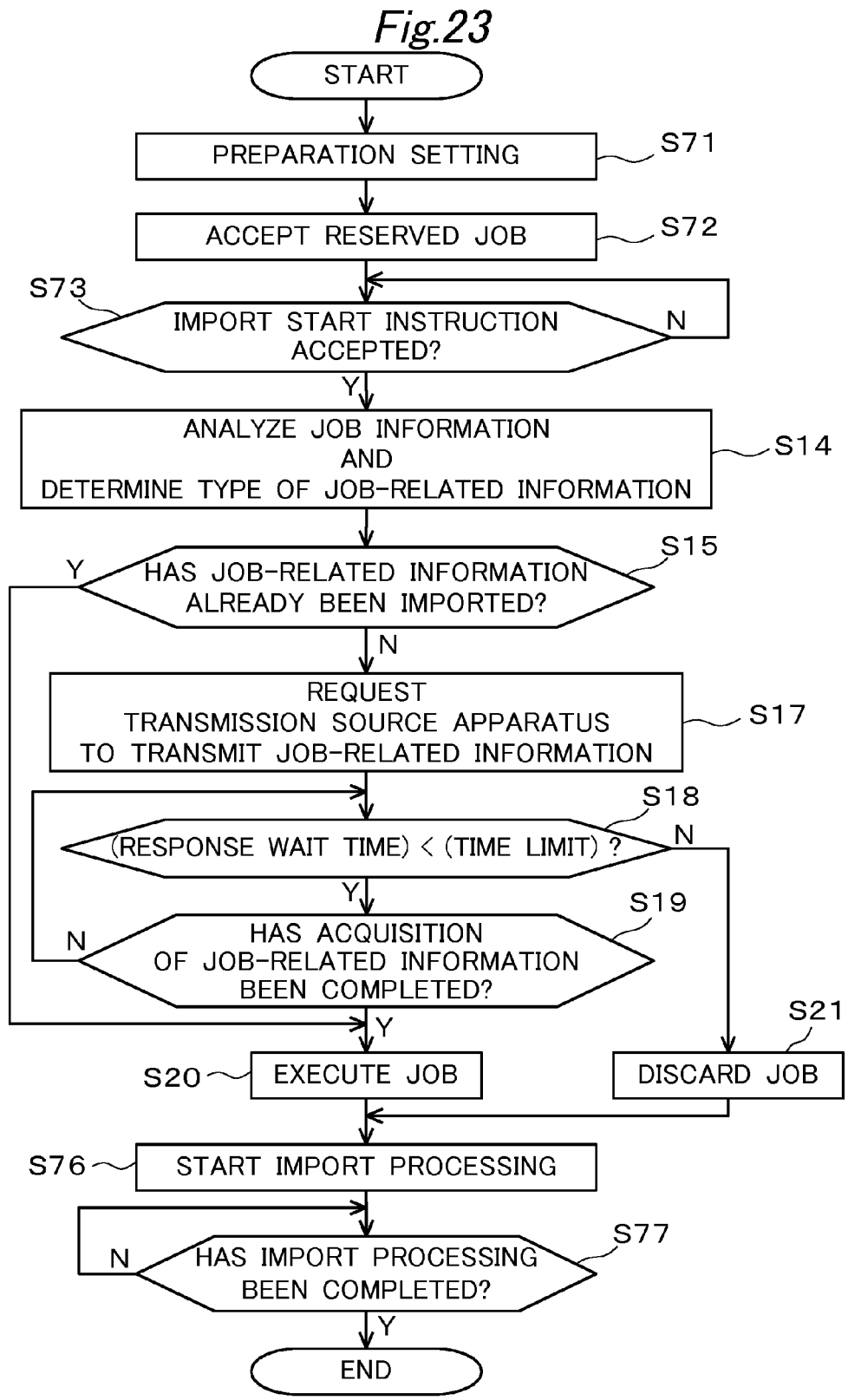
FIG. 23 is a flowchart of operations according to a fifth embodiment.

FIG. 23 is a flowchart of operations according to the fifth embodiment. In the fifth embodiment, as shown in FIG. 23, a preparation operation for the import processing (similar to that in step S11) is performed in step S71. In step S71, the import processing (e.g., the communication operation to transmit the import data DM) has not yet started.

Next, in step S72, a reserved job is accepted before the start of the import processing. Here, the reserved job is a job that is not executed immediately but is to be executed along with the start of the import processing. In step S72, the execution of the job (reserved job) is reserved. Here, it is assumed that the reserved job is an authenticated print job that is accepted from the computer 30 as in the first embodiment. The present invention is, however, not limited to this, and various other types of jobs may be accepted as reserved jobs.

Upon accepting an instruction to start import processing from the user, the MFP 10b performs the processing of steps S14 to S21 before the start of the import processing. The processing of steps S14 to S21 is the same as that in the first embodiment.

Thereafter, the MFP 10b starts the import processing (step S76). If it is determined in step S77 that all of the import data DM has been received, the import processing ends.

According to the embodiment described above, when a reserved job (authenticated print job) is accepted by the MFP 10b before the start of the import processing, the MFP 10b performs the processing of steps S14 to S21 in response to an instruction to start the import processing. Specifically, the MFP 10b first determines the type of the specific information (job-related information) JM required to execute the authenticated print job from among information included in the import data (step S14). Next, the MFP 10b acquires the job-related information JM of the determined type from the MFP 10a (steps S15 to S19). Then, the MFP 10b executes the authenticated print job, using the job-related information JM (specifically, the user information LM1 of the user UA) (step S20). Accordingly, the MFP 10b can acquire the desired information JM and execute the authenticated print job without waiting for the completion of the import processing.

According to the embodiment as described above, it is possible to reserve a job before the start of the import processing, and the reserved job is executed using the receipt of an instruction to start the import processing as a trigger.

The user can thus reserve a job to be executed, at the desired point in time and execute the job (reserved job) relatively early without waiting for the completion of the import processing.

While the fifth embodiment describes a mode in which the processing of steps S14 to S21 is performed in response to an instruction to start the import processing, the present invention is not limited thereto. For example, the import processing start time (e.g., "19:00") may be set for reservation in step S71, and the processing of steps S14 to S21 may be performed upon arrival of the reserved start time ("19:00") that has been set in the reservation setting. This reservation setting may be a setting for reserving the start time of periodic synchronization processing (e.g., at 19:00 every day or every hour on the hour).

While the fifth embodiment describes a mode in which the import processing is started in step S76 performed after steps S14 to S21, instead of being started immediately after receipt of the instruction to start importing, the present invention is not limited thereto. For example, the import processing may be started at a point in time between step S73 and step S14. In this case, the processing of steps S14 to S21 may be performed in parallel with the import processing (or by interrupting the import processing).

6. Sixth Embodiment

A sixth embodiment is a variation on the first embodiment. The following description focuses on differences from the first embodiment.

While the above first embodiment describes a mode in which the import data DM is transmitted from the MFP 10a to the MFP 10b, the present invention is not limited thereto. For example, a configuration is possible in which a USB memory 25 (storage apparatus) storing the import data DM is attached to a connection port (a USB connection port) provided in the MFP 10b, and the MFP 10b (the storage unit 5) acquires the import data DM from the USB memory 25 (see FIG. 24). In other words, the MFP 10b may acquire the import data DM from a memory device (an auxiliary memory device) connected to the MFP 10b. Then, the same idea as described above may be applied when a job is accepted during the aforementioned operation of acquiring the import data DM, so that the job can be executed without waiting for the completion of the import processing.

Figure 24:
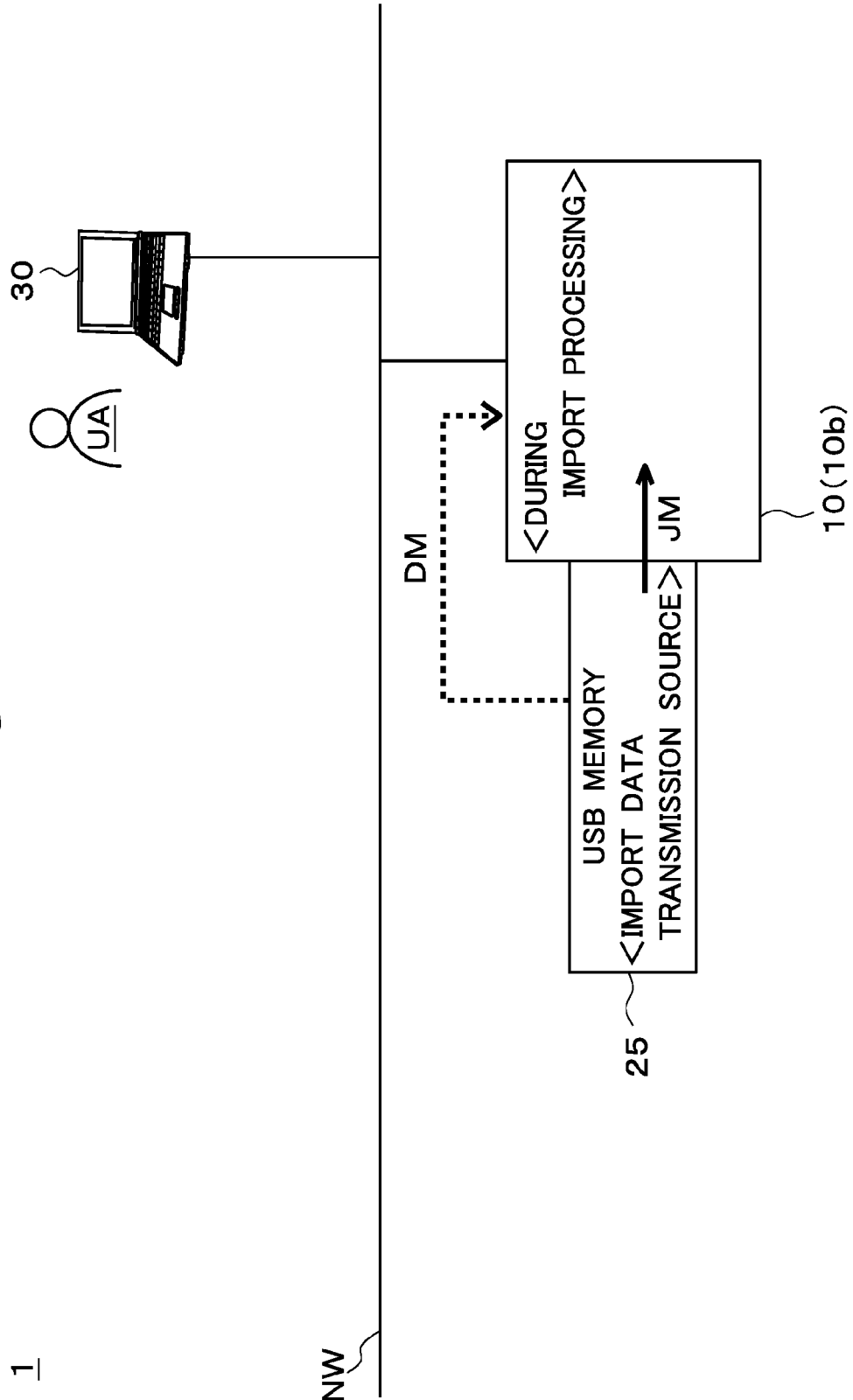
FIG. 24 is a conceptual diagram illustrating a system according to a sixth embodiment.
Figure 25:
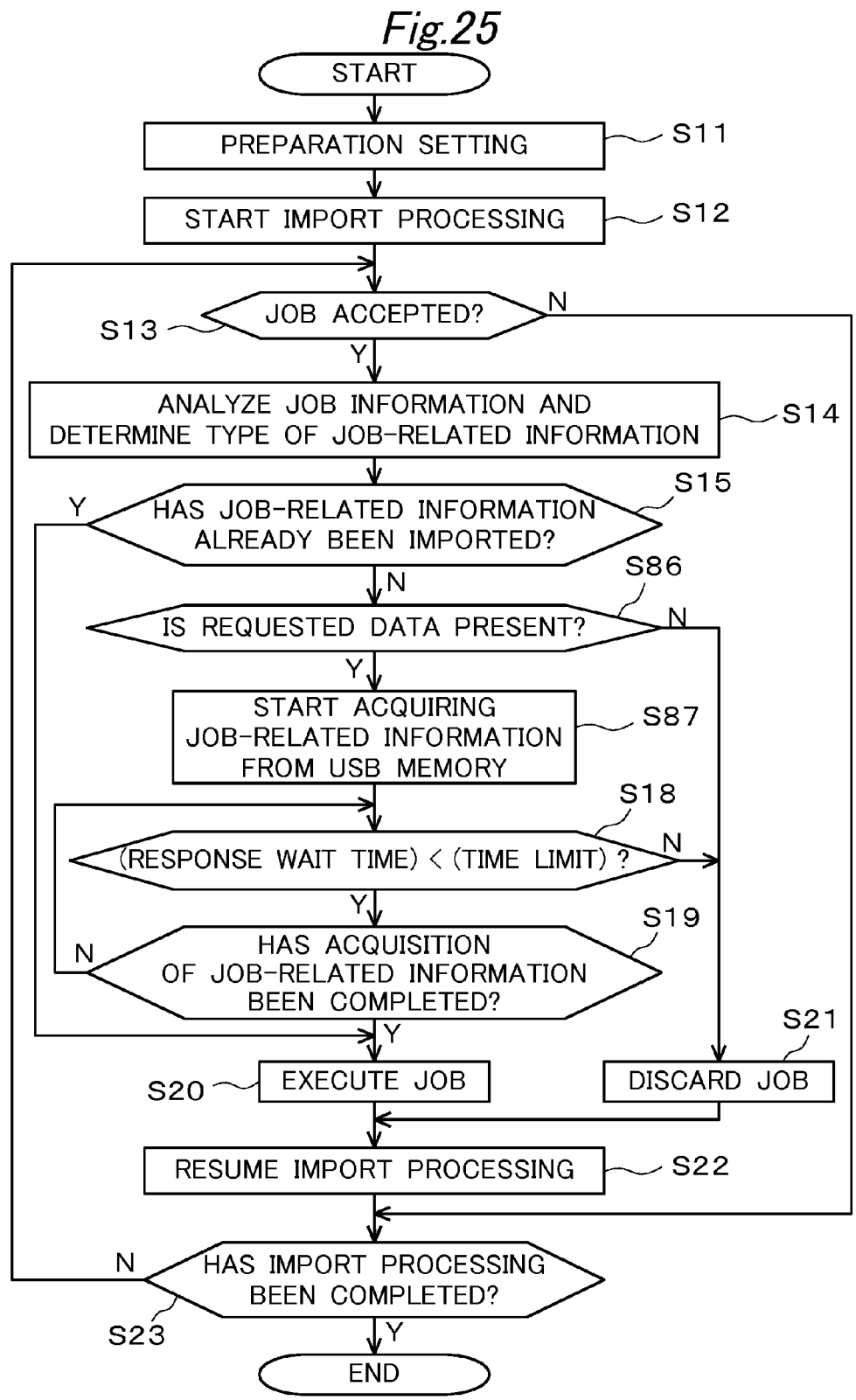
FIG. 25 is a flowchart of operations according to a sixth embodiment.

Such a mode is described in the sixth embodiment. FIG. 24 is a conceptual diagram illustrating such a mode, and FIG. 25 is a flowchart of operations according to the sixth embodiment. While the sixth embodiment shows a USB memory as a memory device connected to the MFP 10b, the present invention is not limited thereto, and the memory device may, for example, be an external hard disk drive.

Steps S11 to S15 in FIG. 25 are the same as those in the first embodiment. If it is determined in step S15 that the job-related information JM has not yet been imported, the processing proceeds to step S86. In step S86, the MFP 10b determines whether or not the requested job-related information JM (the "user information of the user UA") is within the USB memory 25 (specifically, within the import data DM stored in the USB memory 25).

If it is determined that the job-related information JM is not within the USB memory 25, the processing proceeds to step S21.

On the other hand, if it is determined that the job-related information JM is within the USB memory 25, the processing proceeds to step S87. In step S87, the operation of acquiring the job-related information JM is started. Specifically, the MFP 10b starts an operation of reading out the job-related information JM from the USB memory 25 and storing the read job-related information JM into the storage unit 5.

After the processing of steps S18 and S19 has been performed and the acquisition of the job-related information JM has been completed, the processing proceeds to step S20, in which the job is executed on the basis of the acquired job-related information JM.

Such a modification, specifically, a modification in which the import data DM is received from a memory device (e.g., a USB memory or an external hard disk drive) connected to the MFP 10b is also applicable in a similar manner to the other embodiments (e.g., the second to fourth embodiments).

7. Variations

While the above has been a description of embodiments of the present invention, the present invention is not intended to be limited to the examples described above.

For example, while the above sixth embodiment shows an example in which the MFP 10b receives the import data DM from a memory device (e.g., a USB memory or an external hard disk drive) connected to the MFP 10b, the present invention is not limited thereto. For example, the MFP 10b may receive the import data DM from a memory device (e.g., a USB memory or an external hard disk drive) connected to the other MFP 10a.

While the above second embodiment describes a mode in which if the user authentication has succeeded, the job is continued (from step S46 to steps S51 to S54 and S55 in FIG. 14), and if the user authentication has failed, the job is cancelled (from step S46 to step S47), the present invention is not limited thereto. For example, if the user authentication has failed, the processing content of the job may be changed. Specifically, print data in a print job may be temporarily stored in a specific box, and the print data may be printed out by an administrator or another user.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An image forming apparatus comprising:
    an import unit configured to import import data from a storage apparatus in which the import data is stored;
    a job accepting unit configured to accept a job to be executed by the image forming apparatus;
    a determination unit configured to, with respect to the job accepted by the job accepting unit, determine a type of job-related information that is specific information required to execute the job among information included in the import data;
    an acquisition unit configured to acquire, from the storage apparatus, the type of job-related information determined by the determination unit before completion of import processing performed by the import unit; and
    a job execution unit configured to execute the job, using the job-related information acquired by the acquisition unit.

2. The image forming apparatus according to claim 1, wherein
    the acquisition unit is configured to acquire, from the storage apparatus, the job-related information that has not yet been imported from the storage apparatus into the image forming apparatus.

3. The image forming apparatus according to claim 2, wherein
    the acquisition unit is configured to preferentially acquire the job-related information from the storage apparatus after start of the import processing and before completion of the import processing.

4. The image forming apparatus according to claim 3, wherein
    the acquisition unit is configured to cancel acquisition of the job-related information and resume the import processing when the job-related information is not acquired within a predetermined time limit from the storage apparatus.

5. The image forming apparatus according to claim 1, wherein
the job accepting unit is configured to accept a reserved job before start of the import processing, and
the acquisition unit is configured to start acquiring the job-related information in response to an instruction to start the import processing or upon arrival of a reserved start time.

6. The image forming apparatus according to claim 1, wherein
the determination unit is configured to determine the type of the job-related information when the job accepting unit accepts a job during execution of the import processing by the import unit.

7. The image forming apparatus according to claim 1, wherein
the job is a job that involves user authentication, and
the job-related information includes user information.

8. The image forming apparatus according to claim 1, wherein
the job-related information includes first information and second information, and
the acquisition unit is configured to first acquire the first information of the job-related information from the storage apparatus and then acquire the second information from the storage apparatus on condition that continuation of the job is permitted by predetermined processing using the first information.

9. The image forming apparatus according to claim 8, wherein
the job is a job that involves user authentication and access to an in-box file in the image forming apparatus,
the first information includes user information,
the second information includes data for the in-box file, and
the acquisition unit is configured to first acquire the user information of the job-related information from the storage apparatus and then acquire the second information from the storage apparatus on condition that user authentication processing using the user information succeeds.

10. The image forming apparatus according to claim 1, wherein
the job is a box registration job in the image forming apparatus,
the job-related information includes unassigned box ID information that is information regarding an unassigned box ID, and
the job execution unit is configured to permit new registration with respect to the unassigned box ID on the basis of the unassigned box ID information.

11. The image forming apparatus according to claim 1, wherein
the job is an address registration job in the image forming apparatus,
the job-related information includes unassigned address ID information that is information regarding an unassigned address ID, and
the job execution unit is configured to permit new registration with respect to the unassigned address ID on the basis of the unassigned address ID information.

12. The image forming apparatus according to claim 1, wherein
the job is a user registration job in the image forming apparatus,
the job-related information includes unassigned user ID information that is information regarding an unassigned user ID, and
the job execution unit is configured to permit new registration with respect to the unassigned user ID on the basis of the unassigned user ID information.

13. The image forming apparatus according to claim 10, wherein
the job execution unit is configured to reflect a registered content of the new registration in the import data stored in the storage apparatus, and
the import unit is configured to import the import data in which the registered content is reflected.

14. The image forming apparatus according to claim 1, wherein
the storage apparatus is an external computer outside of the image forming apparatus, and
the acquisition unit is configured to acquire the job-related information from the external computer via a network.

15. The image forming apparatus according to claim 1, wherein
the storage apparatus is another image forming apparatus different from the image forming apparatus, and
the acquisition unit is configured to acquire the job-related information from the other image forming apparatus via a network.

16. The image forming apparatus according to claim 14, wherein
the acquisition unit is configured to transmit a transmission request to the storage apparatus, the transmission request being a request to transmit the job-related information to the image forming apparatus, and receive and acquire the job-related information transmitted from the storage apparatus.

17. The image forming apparatus according to claim 1, wherein
the storage apparatus is a memory device connected to the image forming apparatus, and
the acquisition unit is configured to acquire the job-related information from the memory device.

18. A non-transitory computer-readable recording medium recording a program for causing a computer built into an image forming apparatus to execute:
 a) accepting a job to be executed by the image forming apparatus;
 b) determining, with respect to the job accepted, a type of job-related information that is specific information required to execute the job;
 c) before completion of import processing for importing import data from a storage apparatus in which the import data is stored, acquiring, from the storage apparatus, the type of job-related information determined in the step b); and
 d) executing the job, using the job-related information acquired in the step c).

19. An image forming system comprising:
an image forming apparatus; and
a storage apparatus in which import data to be imported into the image forming apparatus is stored,
the image forming apparatus including:
 an import unit configured to import the import data from the storage apparatus;
 a job accepting unit configured to accept a job to be executed by the image forming apparatus;
 a determination unit configured to, with respect to the job accepted by the job accepting unit, determine a type of job-related information that is specific information required to execute the job among information included in the import data;

an acquisition unit configured to acquire, from the storage apparatus, the type of job-related information determined by the determination unit before completion of import processing performed by the import unit; and a job execution unit configured to execute the job, using the job-related information acquired by the acquisition unit.

20. The non-transitory computer-readable recording medium according to claim 18, wherein the image forming apparatus acquires, from the storage apparatus, the job-related information that has not yet been imported from the storage apparatus into the image forming apparatus.

21. The image forming system according to claim 19, wherein the acquisition unit is configured to acquire, from the storage apparatus, the job-related information that has not yet been imported from the storage apparatus into the image forming apparatus.

\* \* \* \* \*